US012652321B2

(12) United States Patent
Tagare et al.

(10) Patent No.: US 12,652,321 B2
(45) Date of Patent: Jun. 9, 2026

(54) TECHNIQUES FOR DYNAMIC RESOLUTIONS

(71) Applicant: QUALCOMM Incorporated, San Diego, CA (US)

(72) Inventors: Arun Ashok Tagare, Hyderabad (IN); Bapineedu Chowdary Gummadi, Hyderabad (IN); Ravi Shankar Kadambala, Hyderabad (IN); Shankar Ganesh Lakshmanaswamy, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/401,755

(22) Filed: Aug. 13, 2021

(65) Prior Publication Data

US 2023/0053216 A1      Feb. 16, 2023

(51) Int. Cl.
*H04L 65/1069* (2022.01)
*H04N 21/4402* (2011.01)
*H04N 21/6437* (2011.01)

(52) U.S. Cl.
CPC ..... *H04L 65/1069* (2013.01); *H04N 21/4402* (2013.01); *H04N 21/6437* (2013.01)

(58) Field of Classification Search
CPC ............ H04L 65/1069; H04N 21/4402; H04N 21/6437
See application file for complete search history.

(56) References Cited

U.S. PATENT DOCUMENTS

| | | | | |
|---|---|---|---|---|
| 7,599,989 | B2 * | 10/2009 | Stevens .................... | H04N 7/16 |
| | | | | 709/204 |
| 8,593,504 | B2 * | 11/2013 | Lin ...................... | H04L 12/1827 |
| | | | | 370/254 |
| 8,832,193 | B1 * | 9/2014 | Lindberg ................ | H04L 67/10 |
| | | | | 709/204 |
| 9,696,866 | B2 * | 7/2017 | Liang ...................... | H04L 67/04 |
| 11,457,271 | B1 * | 9/2022 | Faulkner ................ | H04N 7/152 |
| 11,593,122 | B2 * | 2/2023 | Vetter ................... | G06F 9/4411 |
| 2010/0064244 | A1 * | 3/2010 | Kilpatrick, II ...... | H04M 1/0243 |
| | | | | 345/1.3 |
| 2011/0216153 | A1 * | 9/2011 | Tasker ..................... | H04N 7/15 |
| | | | | 348/E7.083 |

(Continued)

FOREIGN PATENT DOCUMENTS

WO        WO-2017193576 A1 *  11/2017   ..... H04N 21/440263

*Primary Examiner* — Kristie D Shingles
(74) *Attorney, Agent, or Firm* — Paul M. McAdams; Holland & Hart LLP

(57)                ABSTRACT

Methods, systems, and devices for wireless communication are described. A user equipment (UE) may dynamically indicate a resolution change to a display of the UE during a video call. For example, a first UE may communicate a configuration message with a second UE to establish a video call between the first UE and the second UE and indicate a first value for a resolution of a display of the first UE. During the video call, the first UE may identify a change to the resolution of the display and may transmit a message to the second UE that indicates the change to the resolution. In response to receiving the message, the second UE may encode one or more packets including video information for the video call according to a second value for the resolution and transmit the one or more packets to the first UE.

31 Claims, 15 Drawing Sheets

(56) References Cited

U.S. PATENT DOCUMENTS

| | | | | |
|---|---|---|---|---|
| 2012/0173622 A1* | 7/2012 | Toledano | .............. | H04L 65/611 |
| | | | | 709/204 |
| 2014/0219088 A1* | 8/2014 | Oyman | ........... | H04N 21/23439 |
| | | | | 370/231 |
| 2016/0179295 A1* | 6/2016 | Liang | .................... | H04L 67/148 |
| | | | | 715/740 |
| 2017/0084003 A1* | 3/2017 | Parag | .................. | G06F 3/04842 |
| 2017/0115698 A1* | 4/2017 | Lee | ....................... | G02F 1/1339 |
| 2017/0170200 A1* | 6/2017 | Ikeda | ................. | H10D 30/6734 |
| 2017/0374109 A1* | 12/2017 | Atarius | .............. | H04L 65/1104 |
| 2018/0288105 A1* | 10/2018 | Iyer | .................... | H04L 65/1069 |
| 2018/0343416 A1* | 11/2018 | Kim | ....................... | H04N 7/181 |
| 2019/0385375 A1* | 12/2019 | Park | ...................... | G06F 1/1698 |
| 2021/0232409 A1* | 7/2021 | Vetter | .................... | G06F 9/451 |
| 2021/0405865 A1* | 12/2021 | Faulkner | ................ | H04N 7/147 |
| 2022/0021864 A1* | 1/2022 | Mate | ................... | H04N 19/597 |
| 2022/0141488 A1* | 5/2022 | He | ...................... | H04N 19/597 |
| | | | | 375/240.12 |

* cited by examiner

| | |
|---|---|
| 215 | Configuration Message |
| 220 | Video Packet |
| 225 | Video Packet |
| 230 | Change Message |
| 235 | Video Packet |
| 240 | Capability Message |

200

610

620

615

605

600

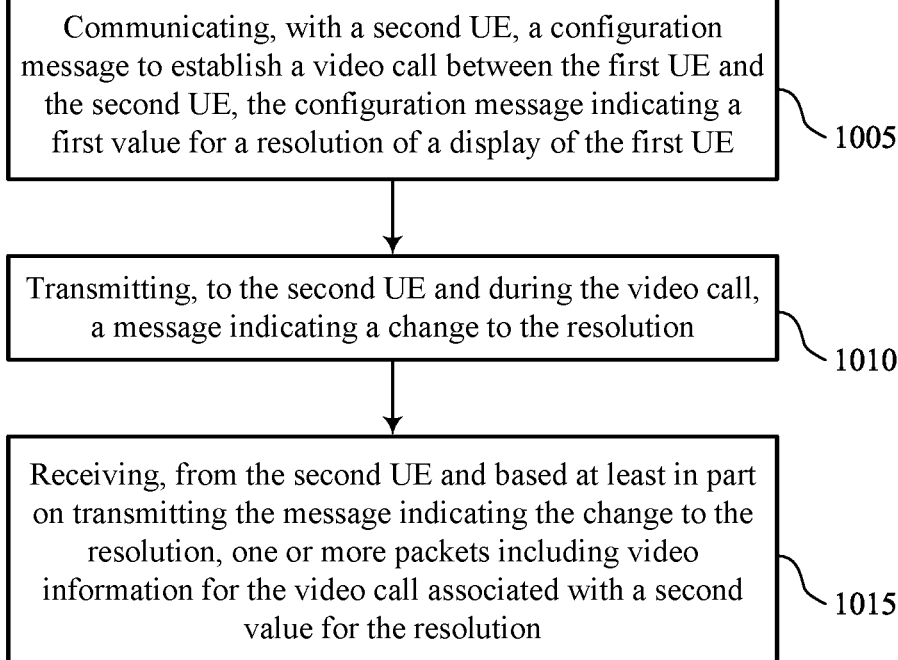

Communicating, with a second UE, a configuration message to establish a video call between the first UE and the second UE, the configuration message indicating a first value for a resolution of a display of the first UE

1005

Transmitting, to the second UE and during the video call, a message indicating a change to the resolution

1010

Receiving, from the second UE and based at least in part on transmitting the message indicating the change to the resolution, one or more packets including video information for the video call associated with a second value for the resolution

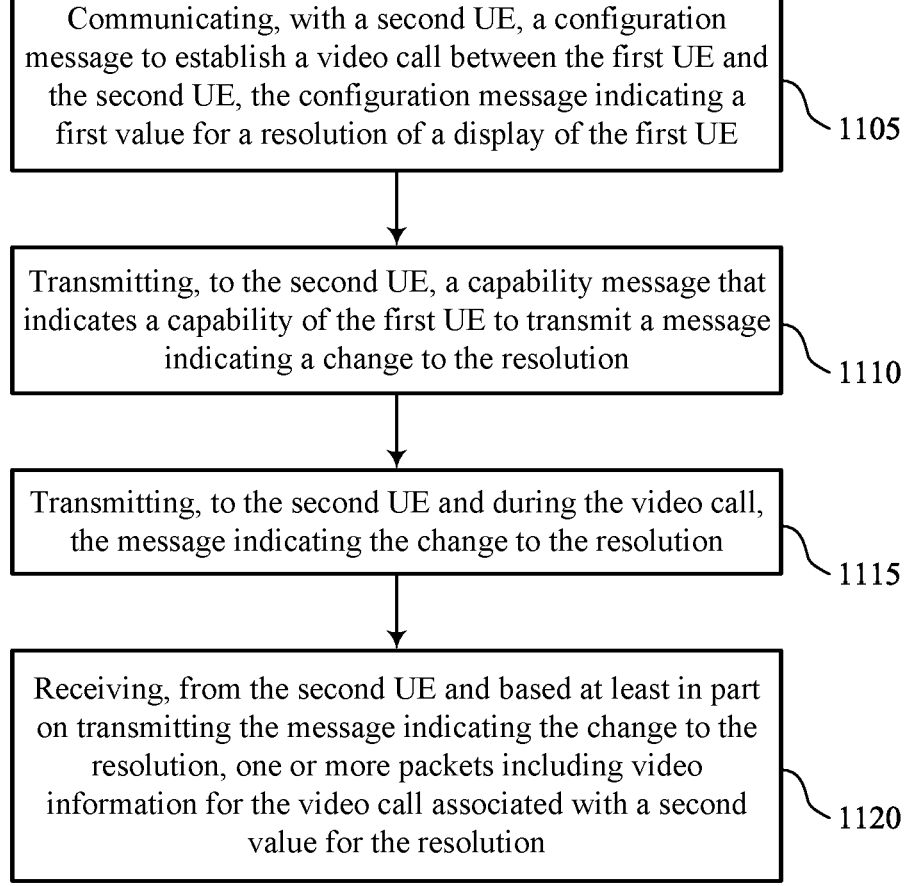

Communicating, with a second UE, a configuration message to establish a video call between the first UE and the second UE, the configuration message indicating a first value for a resolution of a display of the first UE

1105

Transmitting, to the second UE, a capability message that indicates a capability of the first UE to transmit a message indicating a change to the resolution

1110

Transmitting, to the second UE and during the video call, the message indicating the change to the resolution

1115

Receiving, from the second UE and based at least in part on transmitting the message indicating the change to the resolution, one or more packets including video information for the video call associated with a second value for the resolution

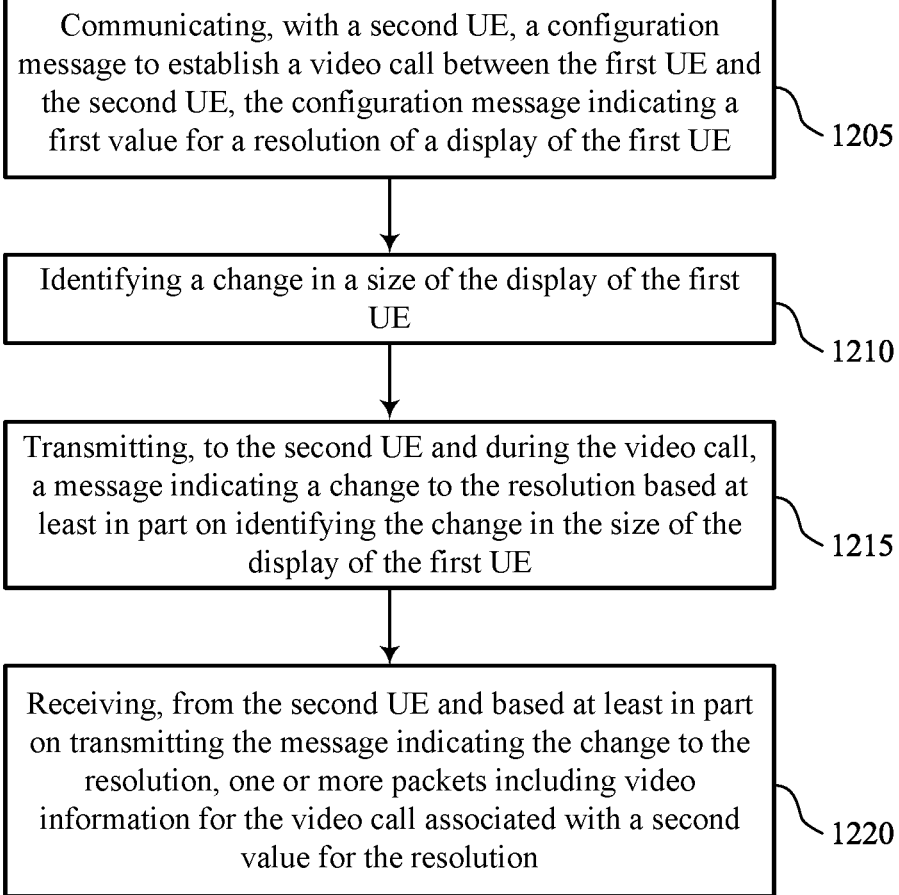

Communicating, with a second UE, a configuration message to establish a video call between the first UE and the second UE, the configuration message indicating a first value for a resolution of a display of the first UE

1205

Identifying a change in a size of the display of the first UE

1210

Transmitting, to the second UE and during the video call, a message indicating a change to the resolution based at least in part on identifying the change in the size of the display of the first UE

1215

Receiving, from the second UE and based at least in part on transmitting the message indicating the change to the resolution, one or more packets including video information for the video call associated with a second value for the resolution

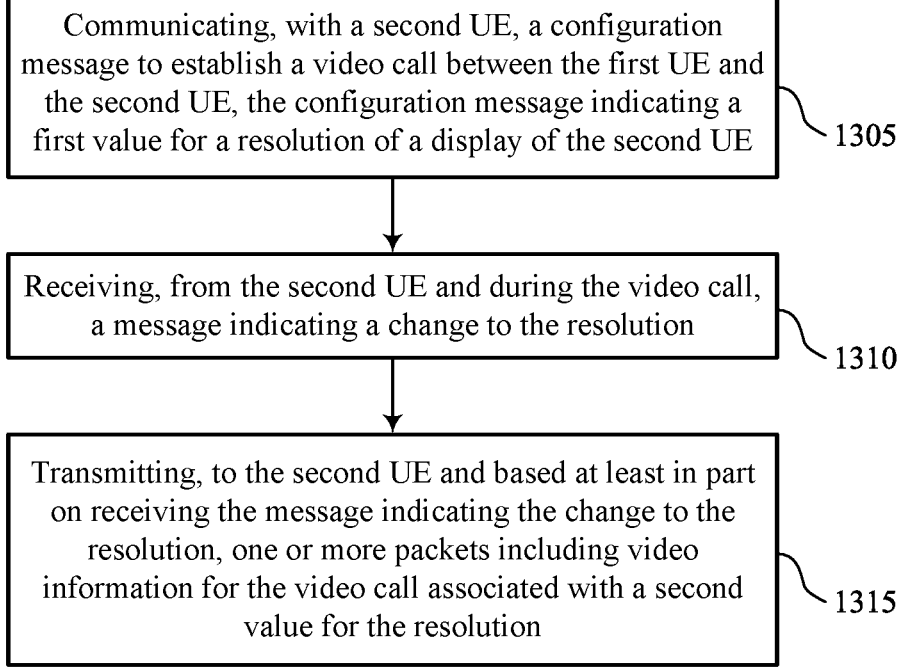

Communicating, with a second UE, a configuration message to establish a video call between the first UE and the second UE, the configuration message indicating a first value for a resolution of a display of the second UE

1305

Receiving, from the second UE and during the video call, a message indicating a change to the resolution

1310

Transmitting, to the second UE and based at least in part on receiving the message indicating the change to the resolution, one or more packets including video information for the video call associated with a second value for the resolution

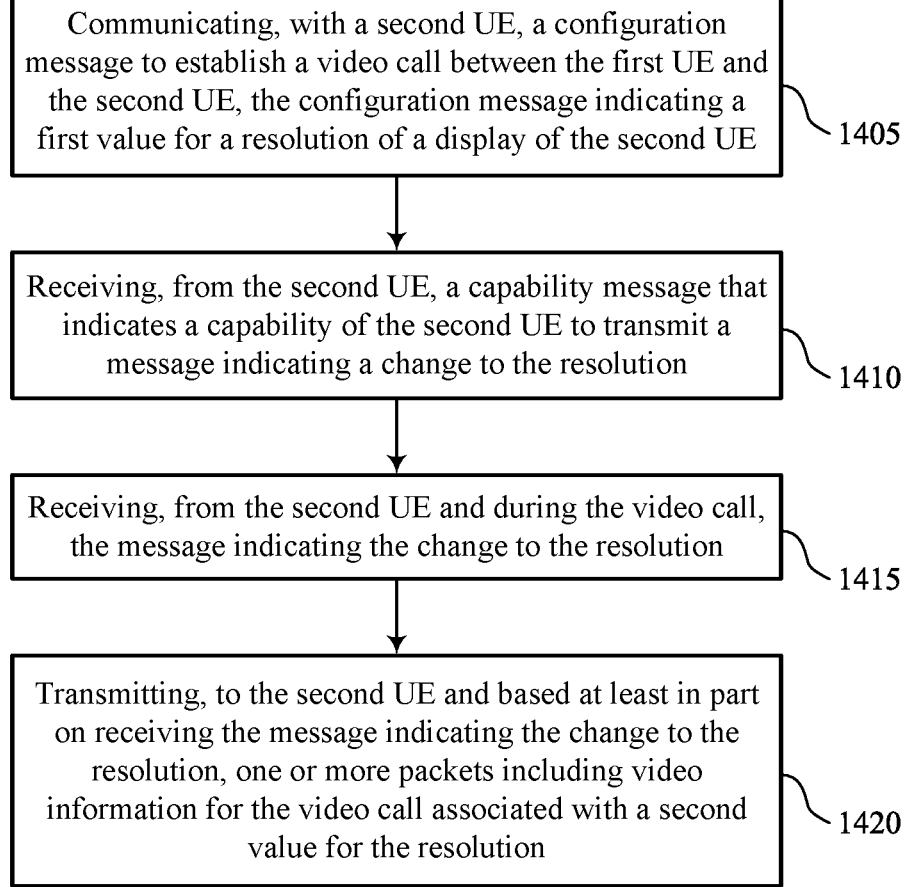

Communicating, with a second UE, a configuration message to establish a video call between the first UE and the second UE, the configuration message indicating a first value for a resolution of a display of the second UE ⟍ 1405

Receiving, from the second UE, a capability message that indicates a capability of the second UE to transmit a message indicating a change to the resolution ⟍ 1410

Receiving, from the second UE and during the video call, the message indicating the change to the resolution ⟍ 1415

Transmitting, to the second UE and based at least in part on receiving the message indicating the change to the resolution, one or more packets including video information for the video call associated with a second value for the resolution ⟍ 1420

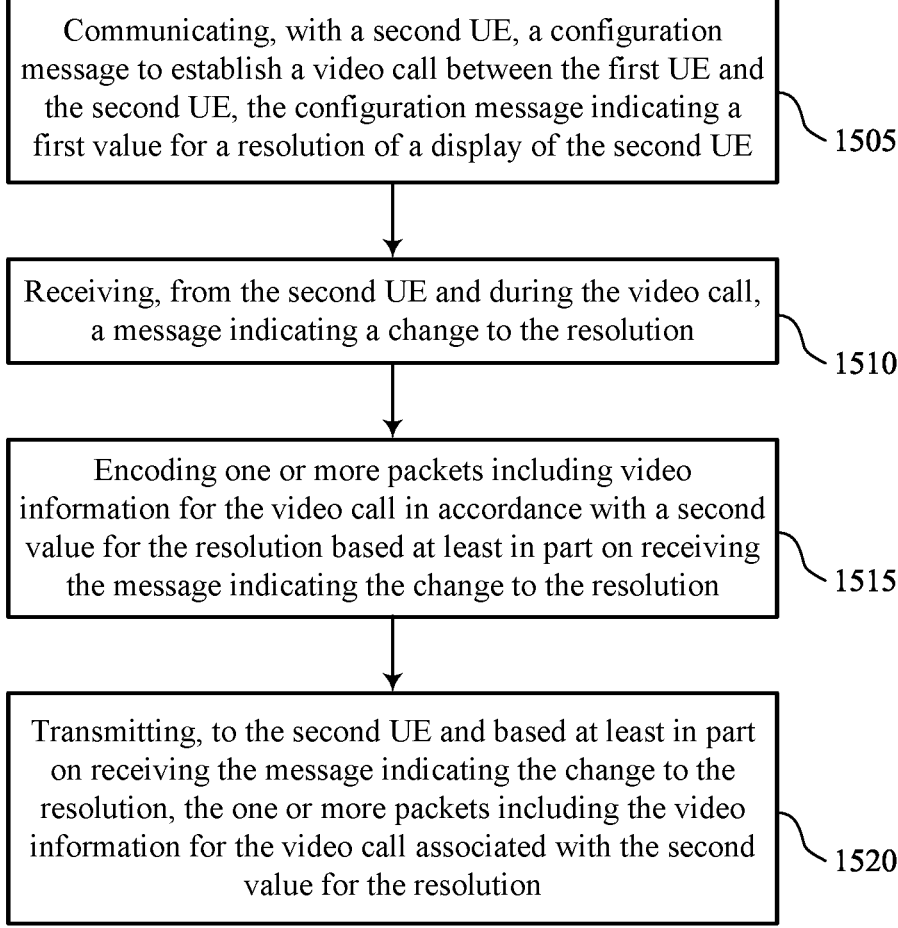

Communicating, with a second UE, a configuration message to establish a video call between the first UE and the second UE, the configuration message indicating a first value for a resolution of a display of the second UE

1505

Receiving, from the second UE and during the video call, a message indicating a change to the resolution

1510

Encoding one or more packets including video information for the video call in accordance with a second value for the resolution based at least in part on receiving the message indicating the change to the resolution

1515

Transmitting, to the second UE and based at least in part on receiving the message indicating the change to the resolution, the one or more packets including the video information for the video call associated with the second value for the resolution

TECHNIQUES FOR DYNAMIC RESOLUTIONS

FIELD OF TECHNOLOGY

The following relates to wireless communication, including techniques for dynamic resolutions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for dynamic resolutions. Generally, the described techniques provide for improving video call latency, resource utilization, and user experience by dynamically indicating resolution changes to a display of a user equipment (UE) during a video call. For example, a first UE may support a video call with a second UE during which the first UE and the second UE may communicate video packets (e.g., packets including video information for the video call) that are encoded based on respective resolutions of respective displays of the first UE and the second UE. To establish the video call, the first UE may transmit a configuration message to the second UE that indicates a first value for a resolution of a display of the first UE. The second UE may use the first value of the resolution to encode video packets transmitted to the first UE. During the video call, the first UE may identify a change to the resolution of the display. For example, a user of the first UE may change a size of the display (e.g., by folding the display, rolling up the display, unfolding the display, unrolling the display, or some other method of changing the size of the display) such that a resolution of the display changes (e.g., increases or decreases). Based on identifying the change to the resolution, the first UE may transmit a message (e.g., a real-time transport protocol (RTP) packet) to the second UE that indicates the change to the resolution.

In response to receiving the message indicating the change to the resolution, the second UE may determine a second value for the resolution of the display of the first UE based on the indicated change. The second UE may encode subsequent video packets according to the second value of the resolution and may transmit the encoded video packets to the first UE. In this way, the first UE and the second UE may support dynamic display resolution changes (e.g., during a video call).

A method for wireless communication at a UE is described. The method may include communicating, with a second UE, a configuration message to establish a video call between the first UE and the second UE, the configuration message indicating a first value for a resolution of a display of the first UE, transmitting, to the second UE and during the video call, a message indicating a change to the resolution, and receiving, from the second UE and based on transmitting the message indicating the change to the resolution, one or more packets including video information for the video call associated with a second value for the resolution.

An apparatus for wireless communication at a first UE is described. The apparatus may include a processor, memory coupled with the processor, and instructions stored in the memory. The instructions may be executable by the processor to cause the apparatus to communicate, with a second UE, a configuration message to establish a video call between the first UE and the second UE, the configuration message indicating a first value for a resolution of a display of the first UE, transmit, to the second UE and during the video call, a message indicating a change to the resolution, and receive, from the second UE and based on transmitting the message indicating the change to the resolution, one or more packets including video information for the video call associated with a second value for the resolution.

Another apparatus for wireless communication at a first UE is described. The apparatus may include means for communicating, with a second UE, a configuration message to establish a video call between the first UE and the second UE, the configuration message indicating a first value for a resolution of a display of the first UE, means for transmitting, to the second UE and during the video call, a message indicating a change to the resolution, and means for receiving, from the second UE and based on transmitting the message indicating the change to the resolution, one or more packets including video information for the video call associated with a second value for the resolution.

A non-transitory computer-readable medium storing code for wireless communication at a first UE is described. The code may include instructions executable by a processor to communicate, with a second UE, a configuration message to establish a video call between the first UE and the second UE, the configuration message indicating a first value for a resolution of a display of the first UE, transmit, to the second UE and during the video call, a message indicating a change to the resolution, and receive, from the second UE and based on transmitting the message indicating the change to the resolution, one or more packets including video information for the video call associated with a second value for the resolution.

Some examples of the method, apparatuses, and non-transitory computer-readable medium described herein may further include operations, features, means, or instructions for transmitting, to the second UE, a capability message that indicates a capability of the first UE to transmit the message indicating the change to the resolution.

In some examples of the method, apparatuses, and non-transitory computer-readable medium described herein, the capability message includes a session description protocol (SDP) packet.

Some examples of the method, apparatuses, and non-transitory computer-readable medium described herein may further include operations, features, means, or instructions for identifying a change in a size of the display of the first UE, where transmitting the message indicating the change to the resolution may be based on identifying the change in the size of the display of the first UE.

In some examples of the method, apparatuses, and non-transitory computer-readable medium described herein, identifying the change in the size of the display may include operations, features, means, or instructions for identifying an increase in the size of the display of the first UE based on the display being unfolded or rolled out, where the message indicating the change to the resolution indicates an increase of the resolution.

In some examples of the method, apparatuses, and non-transitory computer-readable medium described herein, identifying the change in the size of the display may include operations, features, means, or instructions for identifying a decrease in the size of the display of the first UE based on the display being folded or rolled up, where the message indicating the change to the resolution indicates a decrease of the resolution.

In some examples of the method, apparatuses, and non-transitory computer-readable medium described herein, identifying the change in the size of the display may include operations, features, means, or instructions for identifying that the size of the display of the first UE may have changed by a threshold percentage of a total size of the display, where transmitting the message indicating the change to the resolution may be triggered by the size changing by the threshold percentage.

In some examples of the method, apparatuses, and non-transitory computer-readable medium described herein, a value of the threshold percentage may be based on an operating mode of the first UE, and the operating mode includes a power savings mode or a performance mode configured to maintain a quality of the video call at the first UE.

Some examples of the method, apparatuses, and non-transitory computer-readable medium described herein may further include operations, features, means, or instructions for changing a value of the threshold percentage based on identifying that the size of the display of the first UE changes a threshold quantity of times within a duration.

In some examples of the method, apparatuses, and non-transitory computer-readable medium described herein, transmitting the message indicating the change to the resolution may include operations, features, means, or instructions for transmitting the message indicating the change to the resolution after identifying that the size of the display of the first UE may be changed.

Some examples of the method, apparatuses, and non-transitory computer-readable medium described herein may further include operations, features, means, or instructions for adjusting an operating parameter of a camera of the first UE based on the change to the resolution.

Some examples of the method, apparatuses, and non-transitory computer-readable medium described herein may further include operations, features, means, or instructions for identifying that a size of the display of the first UE changes a threshold quantity of times within a duration and refraining from transmitting a second message indicating a second change to the resolution based on identifying that the size of the display of the first UE changes the threshold quantity of times.

In some examples of the method, apparatuses, and non-transitory computer-readable medium described herein, the message indicating the change to the resolution indicates that the resolution increases to a next higher value of the resolution or decreases to a next lower value of the resolution.

In some examples of the method, apparatuses, and non-transitory computer-readable medium described herein, the message indicating the change to the resolution indicates the second value for the resolution from a set of values for the resolution, the set of values for the resolution including at least the first value for the resolution and the second value for the resolution.

In some examples of the method, apparatuses, and non-transitory computer-readable medium described herein, the message indicating the change to the resolution includes a first set of bits corresponding to an identifier associated with the first UE and a second set of bits indicating the change to the resolution.

In some examples of the method, apparatuses, and non-transitory computer-readable medium described herein, the message indicating the change to the resolution includes an RTP packet.

A method for wireless communication at a first UE is described. The method may include communicating, with a second UE, a configuration message to establish a video call between the first UE and the second UE, the configuration message indicating a first value for a resolution of a display of the second UE, receiving, from the second UE and during the video call, a message indicating a change to the resolution, and transmitting, to the second UE and based on receiving the message indicating the change to the resolution, one or more packets including video information for the video call associated with a second value for the resolution.

An apparatus for wireless communication at a first UE is described. The apparatus may include a processor, memory coupled with the processor, and instructions stored in the memory. The instructions may be executable by the processor to cause the apparatus to communicate, with a second UE, a configuration message to establish a video call between the first UE and the second UE, the configuration message indicating a first value for a resolution of a display of the second UE, receive, from the second UE and during the video call, a message indicating a change to the resolution, and transmit, to the second UE and based on receiving the message indicating the change to the resolution, one or more packets including video information for the video call associated with a second value for the resolution.

Another apparatus for wireless communication at a first UE is described. The apparatus may include means for communicating, with a second UE, a configuration message to establish a video call between the first UE and the second UE, the configuration message indicating a first value for a resolution of a display of the second UE, means for receiving, from the second UE and during the video call, a message indicating a change to the resolution, and means for transmitting, to the second UE and based on receiving the message indicating the change to the resolution, one or more packets including video information for the video call associated with a second value for the resolution.

A non-transitory computer-readable medium storing code for wireless communication at a first UE is described. The code may include instructions executable by a processor to communicate, with a second UE, a configuration message to establish a video call between the first UE and the second UE, the configuration message indicating a first value for a resolution of a display of the second UE, receive, from the second UE and during the video call, a message indicating a change to the resolution, and transmit, to the second UE and based on receiving the message indicating the change to the resolution, one or more packets including video information for the video call associated with a second value for the resolution.

Some examples of the method, apparatuses, and non-transitory computer-readable medium described herein may further include operations, features, means, or instructions for receiving, from the second UE, a capability message that indicates a capability of the second UE to transmit the message indicating the change to the resolution.

In some examples of the method, apparatuses, and non-transitory computer-readable medium described herein, the capability message includes an SDP packet.

Some examples of the method, apparatuses, and non-transitory computer-readable medium described herein may further include operations, features, means, or instructions for encoding the one or more packets including the video information for the video call in accordance with the second value for the resolution based on receiving the message indicating the change to the resolution.

Some examples of the method, apparatuses, and non-transitory computer-readable medium described herein may further include operations, features, means, or instructions for selecting a codec for encoding the one or more packets including the video information for the video call based on the second value for the resolution.

In some examples of the method, apparatuses, and non-transitory computer-readable medium described herein, the message indicating the change to the resolution indicates an increase of the resolution.

In some examples of the method, apparatuses, and non-transitory computer-readable medium described herein, the message indicating the change to the resolution indicates a decrease of the resolution.

In some examples of the method, apparatuses, and non-transitory computer-readable medium described herein, the message indicating the change to the resolution indicates that the resolution increases to a next higher value of the resolution or decreases to a next lower value of the resolution.

In some examples of the method, apparatuses, and non-transitory computer-readable medium described herein, the message indicating the change to the resolution indicates the second value for the resolution from a set of values for the resolution, the set of values for the resolution including at least the first value for the resolution and the second value for the resolution.

In some examples of the method, apparatuses, and non-transitory computer-readable medium described herein, the message indicating the change to the resolution includes a first set of bits corresponding to an identifier associated with the second UE and a second set of bits indicating the change to the resolution.

In some examples of the method, apparatuses, and non-transitory computer-readable medium described herein, the message indicating the change to the resolution includes an RTP packet.

BRIEF DESCRIPTION OF THE DRAWINGS

FIGS. 10 through 15 show flowcharts illustrating methods that support techniques for dynamic resolutions in accordance with aspects of the present disclosure.

DETAILED DESCRIPTION

Figure 1:
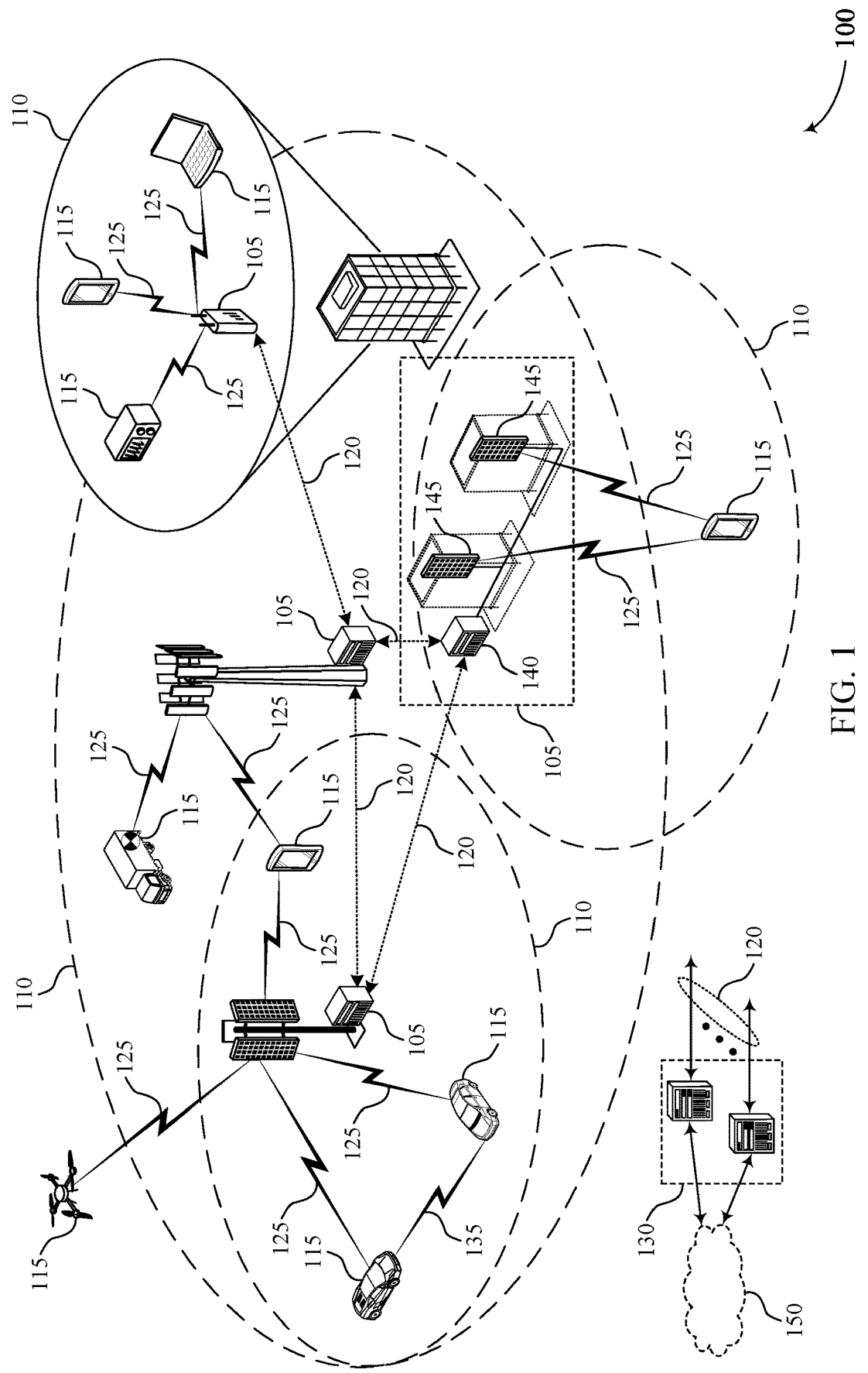
FIGS. 1 and 2 illustrate examples of wireless communications systems that support techniques for dynamic resolutions in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, a wireless communications system may support video calls between two or more UEs. During configuration (e.g., establishment) of a video call, each UE participating in the video call may indicate a value for a resolution of a display of the UE (e.g., 480p, 720p, 1080p, 4 k, 8 k, or some other resolution value), which the other UE(s) may use to encode and transmit video packets (e.g., packets including video information for the video call) in accordance with the indicated resolution value during the video call. Thus, a UE that is transmitting packets to a receiving UE as part of a video call may encode the packets according to the resolution of the receiving UE.

In some examples, a UE may support a change to the resolution of its display. For example, a user of the UE may change a size of the display (e.g., by folding the display, rolling up the display, unfolding the display, unrolling the display, rolling up the display, or some other method of changing the size of the display) such that a resolution of the display changes (e.g., increases or decreases). In some cases, the resolution of the display may change during a video call such that the changed resolution is different from the resolution indicated during configuration of the video call. However, a second UE participating in the video call may be unaware of the change and may continue to transmit video packets to the UE that are encoded according to the originally indicated resolution. Accordingly, if the resolution of the display is increased (e.g., due to an increase in the size of the display), video packets encoded at the originally indicated resolution may include insufficient information to maintain video quality at the increased resolution, thus resulting in reduced video quality and user experience. Alternatively, if the resolution of the display is decreased (e.g., due to a decrease in the size of the display), the UE may not be able to scale down the higher resolution video packets to the decreased resolution, which may result in the unnecessary waste of communication and computing resources at the UE.

Techniques, systems, and devices are described herein to dynamically indicate resolution changes during a video call to improve latency, user experience, resource utilization, image quality, and video quality of the video call. For example, a first UE and a second UE may communicate one or more configuration messages to establish (e.g., configure parameters of) a video call between the first UE and second UE. The one or more configuration messages may indicate a value for a resolution of a display of a respective UE. For example, the first UE may transmit a first configuration message to the second UE that indicates a value for a resolution of a display of the first UE, and the second UE may transmit a second configuration message to the first UE that indicates a value for a resolution of a display of the second UE. The first UE and the second UE may then communicate video packets during the video call that are encoded according to the respectively indicated resolution values.

During the video call, the first UE may identify a change to the resolution of the display of the first UE, for example, due to a user of the first UE changing a size of the display of the first UE such that the resolution of the display changes (e.g., increases or decreases). Based on identifying the change to the resolution, the first UE may transmit a message (e.g., a real-time transport protocol (RTP) packet) to the second UE that indicates the change to the resolution. In response to receiving the message indicating the change to the resolution, the second UE may determine a second value for the resolution of the display of the first UE based on the indicated change. The second UE may encode subsequent video packets according to the second value of the resolution of the display of the first UE and may transmit the encoded video packets to the first UE.

Aspects of the subject matter described in this disclosure may be implemented to realize one or more of the following potential improvements, among others. The techniques employed by the UEs may provide benefits and enhancements to the operation of the UEs. For example, operations performed by the UEs may provide improvements to video calls. In some examples, indicating dynamic display resolution changes may enable UEs to adaptively encode video packets during a video call, thereby improving user experience, video quality, communication resource usage, and computing or process resource usage during the video call. In some other examples, indicating dynamic display resolution changes may provide improvements to latency, power consumption, data rates, coordination between devices, battery life, and processing capability among other benefits.

Aspects of the disclosure are initially described in the context of wireless communications systems. Aspects of the disclosure are additionally described in the context of a display change diagram, a messaging scheme, and a process flow. Aspects of the disclosure are further illustrated by and described with reference to apparatus diagrams, system diagrams, and flowcharts that relate to techniques for dynamic resolutions.

FIG. 1 illustrates an example of a wireless communications system 100 that supports techniques for dynamic resolutions in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, 80 megahertz (MHz), etc.). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support multimedia sessions between two or more UEs 115 (e.g., via sidelink communications between the two or more UEs 115, facilitated via one or base stations 105) such as voice calls, video calls, or some other multimedia session. To establish (e.g., configure) a multimedia session, UEs 115 participating in the multimedia session may exchange one or more configuration messages such as a session initiation protocol (SIP) message, a session description protocol (SDP) message, or a combination of these or other configuration messages. SIP messages may be communicated to initiate, maintain, or terminate a multimedia session (e.g., a voice call, a video call) between UEs 115. In some examples, an SIP message may include or work in conjunction with one or SDP messages to configure (e.g., negotiate) one or more parameters for the multimedia session. For example, an SDP message may include session level information and media level information for the multimedia session (e.g., initiated by an SIP message) which may enable to UEs 115 to correctly exchange IP packets during the multimedia session. Examples of session level information may include a protocol version of the SDP message, an identifier of the initiating UE, an identifier for the multimedia session, a session name, a session time, time zone adjustments, encryption keys, a bandwidth for the multimedia session, connection information, phone numbers, email addresses, among other types of session level information. Examples of media level information may include a media name, a transport address, a media title, a bandwidth for the multimedia session, connection information, encryption keys, frame rates, clock rates, payload types, and codec information, among other types of media level information.

UEs 115 participating in a multimedia session may communicate packets (e.g., IP packets, audio packets, video packets, RTP packets) according to the parameters configured by SDP messages. RTP packets may be used to communicate real-time data such as audio data and video data during a multimedia session. An RTP packet may include at least an RTP header and an RTP payload. The RTP header may include a set of bits indicating a version number associated with the RTP packet, whether the RTP packet is bit padded (e.g., to satisfy a size associated with an encryption algorithm), whether the RTP packet includes an extension header (e.g., following the RTP header), a timestamp, and a payload type, among other information indicated by the RTP header. The RTP payload may include the audio data and/or the video data carried by the RTP packet.

If configuring the parameters for a video call, a UE 115 may indicate a value for a resolution of a display of the UE 115. For example, the UE 115 may transmit a configuration message (e.g., an SDP message) during configuration (e.g., establishment) of the video call that indicates the value for the resolution of the display. Accordingly, other UEs 115 participating in the video call may transmit video packets (e.g., RTP packets) to the UE 115 during the video call that are encoded according to the indicated value for the resolution of the display.

A UE 115 may include a display having an adjustable size. For example, a user of a UE 115 may increase the size of the display by unfolding the display or unrolling (e.g., rolling out) the display, among other methods of increasing the size of the display. Alternatively, the user may decrease the size of the display by folding the display or rolling (e.g., rolling up) the display, among other methods of decreasing the size of the display. As a result of adjusting the size of the display, a resolution of the display may change (e.g., the value for the resolution may increase or decrease). In some cases, a change to the resolution during a video call (e.g., after indicating a value for the resolution during configuration of the video call) may result in reduced user experience, reduced video quality, and inefficient resource usage, for example, due to receiving video packets encoded according to the originally indicated resolution from one or more UEs 115 that are unaware of the change to the resolution.

Various aspects of the described techniques support signaling that indicates dynamic changes to resolutions of UE displays to improve user experience, video quality, and resource usage associated with video calls. For example, during a video call between two or more UEs 115, a first UE 115 may identify a change to a resolution of its display (e.g., due to a user of the first UE 115 adjusting a size of the display). Based on identifying the change to the resolution, the first UE 115 may transmit a message (e.g., an RTP packet) to one or more other UEs 115 (e.g., in some cases, video calls can occur between three or more UEs) that indicates the change to the resolution. In response to receiving the message indicating the change to the resolution, the one or more other UEs 115 may determine a new value for the resolution of the display of the first UE 115 based on the indicated change. The one or more other UEs 115 may transmit subsequent video packets (e.g., RTP packets including video information for the video call) that are encoded according to the second value of the resolution of the display of the first UE 115. In this way, the first UE 115 may dynamically indicate a change to the resolution of its display during a video call so that other UEs 115 participating in the video call may encode and transmit video packets in accordance with the changed resolution.

Figure 2:
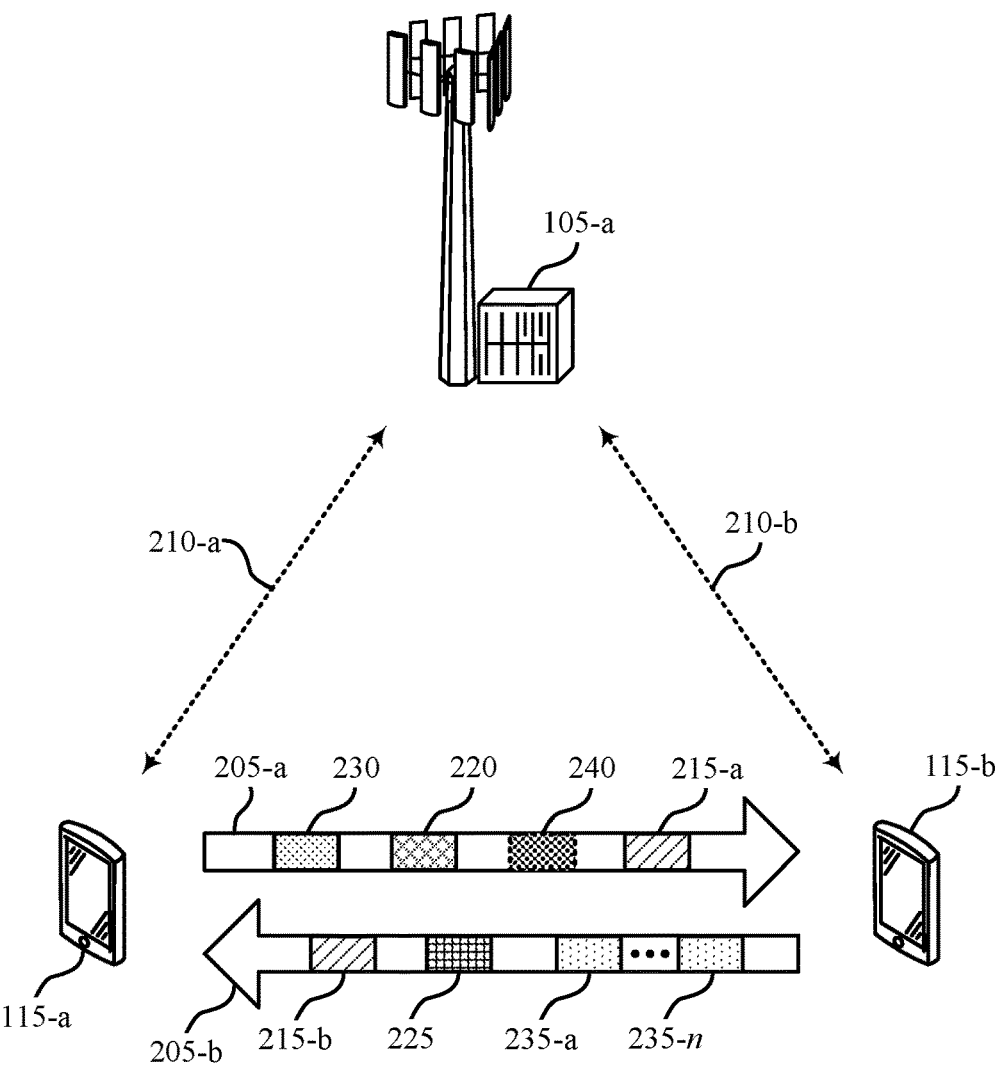
Figure 2:
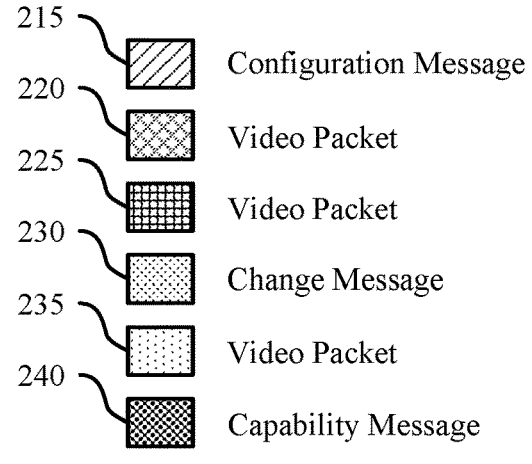

FIG. 2 illustrates an example of a wireless communications system 200 that supports techniques for dynamic resolutions in accordance with aspects of the present disclosure. The wireless communications system 200 may implement aspects of the wireless communications system 100 or may be implemented by aspects of the wireless communications system 100. For example, the wireless communications system 200 may include a base station 105-a, a UE 115-a, and a UE 115-b, which may be examples of the corresponding devices described with reference to FIG. 1. In some examples, the wireless communications system 200 may support one or more RATs including 4G systems such as LTE systems, LTE-A systems, or LTE-A Pro systems, 5G systems which may be referred to as NR systems, or a combination of these or other RATs.

For illustrative purposes, FIG. 2 depicts the wireless communications system 200 as including one base station 105 and two UEs 115, however, the principles disclosed herein may be adapted and applied to include any quantity of base stations 105 and UEs 115.

The wireless communications system 200 may support communications between the UE 115-a and the UE 115-b, the base station 105-a and the UE 115-a, and the base station 105-a and the UE 115-b. For example, the UE 115-a may transmit messages to the UE 115-b over a channel 205-a, and the UE 115-b may transmit messages to the UE 115-a over a channel 205-b. In some examples, the channel 205-a, the channel 205-b, or a combination thereof, may be examples of sidelinks (e.g., a D2D communication link 135) over which the UE 115-a and the UE 115-b may directly communicate messages to each other.

In some other examples, the messages communicated over the channel 205-a, the channel 205-b, or a combination thereof, may be communicated via one or more base stations 105 (e.g., the base station 105-a). For example, the base station 105-a may communicate with the UE 115-a via a communication link 210-a and may communicate with the UE 115-b via a communication link 210-b, which may be examples of communication links 125 described with reference to FIG. 1. In some cases, the base station 105-a may receive messages from the UE 115-a intended for the UE 115-b and may transmit the messages to the UE 115-b. In some other cases, the base station 105-a may receive messages from the UE 115-b intended for the UE 115-a and may transmit the messages to the UE 115-a. In some examples, the base station 105-a may forward messages received from the UE 115-a or the UE 115-b to one or more other base stations 105 (not shown), which may subsequently transmit the received messages to the UE 115-b or the UE 115-a (e.g., if the UE 115-a and the UE 115-b are located in different coverage areas or cells).

The wireless communications system 200 may support multimedia sessions such as video calls between the UE 115-a and the UE 115-b. The UE 115-a and the UE 115-b may establish a video call by communicating one or more configuration messages 215 over the channels 205. For example, the UE 115-a may transmit a configuration message 215-a to the UE 115-b, and the UE 115-b may transmit a configuration message 215-b to the UE 115-a. The configuration message 215-a may indicate a first value for a resolution of a display of the UE 115-a, and the configuration message 215-b may indicate a first value for a resolution of a display of the UE 115-b. In some examples, the configuration message 215-a and the configuration message 215-b may be examples of an SIP message or an SDP message, which may, in some cases, configure other parameters for the video call (e.g., session level information, media level information) in addition to indicating the respective values for the resolutions.

Based on the exchange of the configuration message 215-a and the configuration message 215-b, the UE 115-a and the UE 115-b may begin to communicate video packets (e.g., RTP packets including video information, IP packets including video information) during the video call (e.g., during the multimedia session). For example, the UE 115-a may transmit one or more video packets 220 to the UE 115-b that are encoded in accordance with the first value for the resolution of the display of the UE 115-b indicated by the configuration message 215-b. Additionally, or alternatively, the UE 115-b may transmit one or more video packets 225 to the UE 115-a that are encoded in accordance with the first value for the resolution of the display of the UE 115-a indicated by the configuration message 215-a.

In some examples, the UE 115-a may configure an encoder at the UE 115-a to encode the video packets 220 according to the first value for the resolution of the display of the UE 115-b (e.g., in response to receiving the configuration message 215-b). Additionally, or alternatively, the UE 115-b may configure an encoder at the UE 115-b to encode the video packets 225 according to the first value for the resolution of the display of the UE 115-a (e.g., in response to receiving the configuration message 215-a). In some cases, the UE 115-a and the UE 115-b may each select a codec (e.g., an H.264 codec, a Moving Picture Experts Group (MPEG) codec, or some other codec) having a profile level (e.g., profile level 1, 1.1, 1.2 1.3, 2, 2.1, 2.2, 2.3, 3, or some other profile level) that supports encoding the video packets 220 and the video packets 225 according to the respective resolution values. For example, a codec may support encoding up to a maximum resolution for a given profile level (e.g., a profile level 1.2 may support encoding videos having up to a resolution of 352×288 in common intermediate format (CIF)). Accordingly, the UE 115-a may select a first codec (e.g., to be used by the encoder at the UE 115-a) having a first profile level that supports at least the indicated first value for the resolution of the display of the UE 115-*b*, and the UE 115-*b* may select a second codec (e.g., to be used by the encoder at the UE 115-*b*) having a second profile level that supports at least the indicated first value for the resolution of the display of the UE 115-*a*. The first profile level and the second profile level may be a same profile level or a different profile level. In some examples, the UE 115-*a* or the UE 115-*b* may select a codec having a higher profile level than is sufficient if the other UE 115 selects the codec in order to maintain a symmetry of selected codecs between the UE 115-*a* and the UE 115-*b*.

During the video call, the UE 115-*a* may determine a change to the resolution of its display. For example, the display of the UE 115-*a* may have an adjustable size. For instance, a user of the UE 115-*a* may increase the size of the display of the UE 115-*a* by unfolding or rolling out the display of the UE 115-*a*, among other examples of increasing the size of the display of the UE 115-*a*. Additionally, the user of the UE 115-*a* may decrease the size of the display of the UE 115-*a* by folding or rolling up the display of the UE 115-*a*, among other examples of decreasing the size of the display of the UE 115-*a*. In some cases, changing the size of the display of the UE 115-*a* (e.g., by the user of the UE 115-*a*) may change its resolution (e.g., increase or decrease the resolution with respect to the first value of the resolution indicated by the configuration message 215-*a*). The UE 115-*a* may identify the change in the size of the display of the UE 115-*a* (e.g., identify the folding, unfolding, rolling up, or unrolling of the display of the UE 115-*a*) and may determine whether the change in size increases, decreases, or maintains (e.g., if the change in size fails to satisfy a threshold amount of change (or difference) away from the current resolution) the resolution of the display of the UE 115-*a*. In some examples, the UE 115-*a* may determine a new value for the resolution of its display based on the identified change in size.

The UE 115-*a* may transmit a change message 230 to the UE 115-*b* that indicates the change to the resolution of its display, for example, in response to identifying the change in the size of its display. In some examples, the change message 230 may be or be included in an RTP packet. In some cases, the change message 230 may be or be included in an extension header of an RTP packet. In some examples, the change message 230 may indicate an increase or a decrease to the resolution of the display of the UE 115-*a*. For example, during configuration of the video call, the UE 115-*a* and the UE 115-*b* may communicate one or more configuration messages 215 (e.g., the configuration message 215-*a* and/or the configuration message 215-*b*) that configure a set of values for the resolutions of the display of the UE 115-*a* and the UE 115-*b* (e.g., set ranges, categories, or buckets for resolutions). Here, the configuration message 215-*a* and the configuration message 215-*b* may each indicate a value of the set of values as the first value for the resolution of the display of the UE 115-*a* and the first value for the resolution of the display of the UE 115-*b*, respectively. The change message 230 may indicate an increase of the resolution to a higher value of the set of values (e.g., a next higher value of the resolution, a next next higher value of the resolution, and so on) or a decrease of the resolution to a lower value of the set of values (e.g., a next lower value of the resolution, a next next lower value of the resolution, and so on). In some other examples, the change message 230 may indicate an index of the set of values corresponding to a new value for the resolution of the display of the UE 115-*a*.

In still some other examples, the change message 230 may indicate the new value for the resolution of the display of the UE 115-*a*.

In some examples, the UE 115-*a* may transmit a capability message 240 to notify the UE 115-*b* of its capability to dynamically indicate a change to the resolution of the display of the UE 115-*a* during the video call. For example, the UE 115-*a* may transmit the capability message 240 that indicates a capability of the UE 115-*a* to identify a change in a size of its display, transmit the change message 230, or a combination thereof (e.g., during the video call). In some examples, the capability message 240 may be included in the configuration message 215-*a*. In some cases, the capability message 240 may be or be included in an SIP message or an SDP message.

The UE 115-*b* may receive the change message 230 and may determine a second value (e.g., the new value) for the resolution of the display of the UE 115-*a* based on the change message 230. For example, if the change message 230 indicates an increase to the resolution, the UE 115-*b* may select a second value for the resolution that is higher relative to the first value for the resolution indicated by the configuration message 215-*a* based on the indicated increase (e.g., a next higher value for the resolution). Alternatively, if the change message 230 indicates a decrease to resolution, the UE 115-*b* may select a second value for the resolution that is lower relative to the first value for the resolution indicated by the configuration message 215-*a* based on the indicated decrease (e.g., a next lower value for the resolution). In some examples, the UE 115-*b* may select a second value for the resolution that corresponds to the index of the set of values indicated by the change message 230. In some other examples, the UE 115-*b* may determine the second value for the resolution based on the change message 230 indicating the second value for the resolution.

In response to receiving the change message 230, the UE 115-*b* may transmit one or more video packets 235 to the UE 115-*a* that are associated with the second value for the resolution. For example, the UE 115-*b* may transmit video packets subsequent to receiving the change message 230 (e.g., video packets 235-*a* through 235-*n*) to the UE 115-*a* that are associated with the second value for the resolution. For instance, the UE 115-*b* may encode the video packets 235 according to the second value for the resolution in response to receiving the change message 230 and may transmit the encoded video packets 235 to the UE 115-*a*. In some cases, the UE 115-*b* may reconfigure the encoder at the UE 115-*b* to encode video packets 235 according to the second value for the resolution. In some examples, the UE 115-*b* may select a second codec (e.g., as at least part of reconfiguring the encoder at the UE 115-*b*) having a third profile level that supports the encoding of the video packets 235 according to the second value of the resolution and may encode the video packets 235 using the second codec. In some examples, the UE 115-*a* may select the second codec having the third profile level to use to encode video packets 220 transmitted subsequent to transmitting the change message 230 in order to maintain a symmetry of selected codecs between the UE 115-*a* and the UE 115-*b*.

In this way, the UE 115-*a* may dynamically indicate a change to the resolution of the display of the UE 115-*a* to the UE 115-*b*, and the UE 115-*b* may dynamically adjust the encoding of video packets transmitted to the UE 115-*a* during the video call to improve user experience, video quality, and resource usage, among other benefits. It is noted that the UE 115-*a* may identify any quantity of changes to the resolution of the display of the UE 115-*a* during the video call, thus resulting in the transmission of any quantity of change messages 230 and the change to the encoding of video packets transmitted to the UE 115-*a* any quantity of times during the video call.

Figure 3:
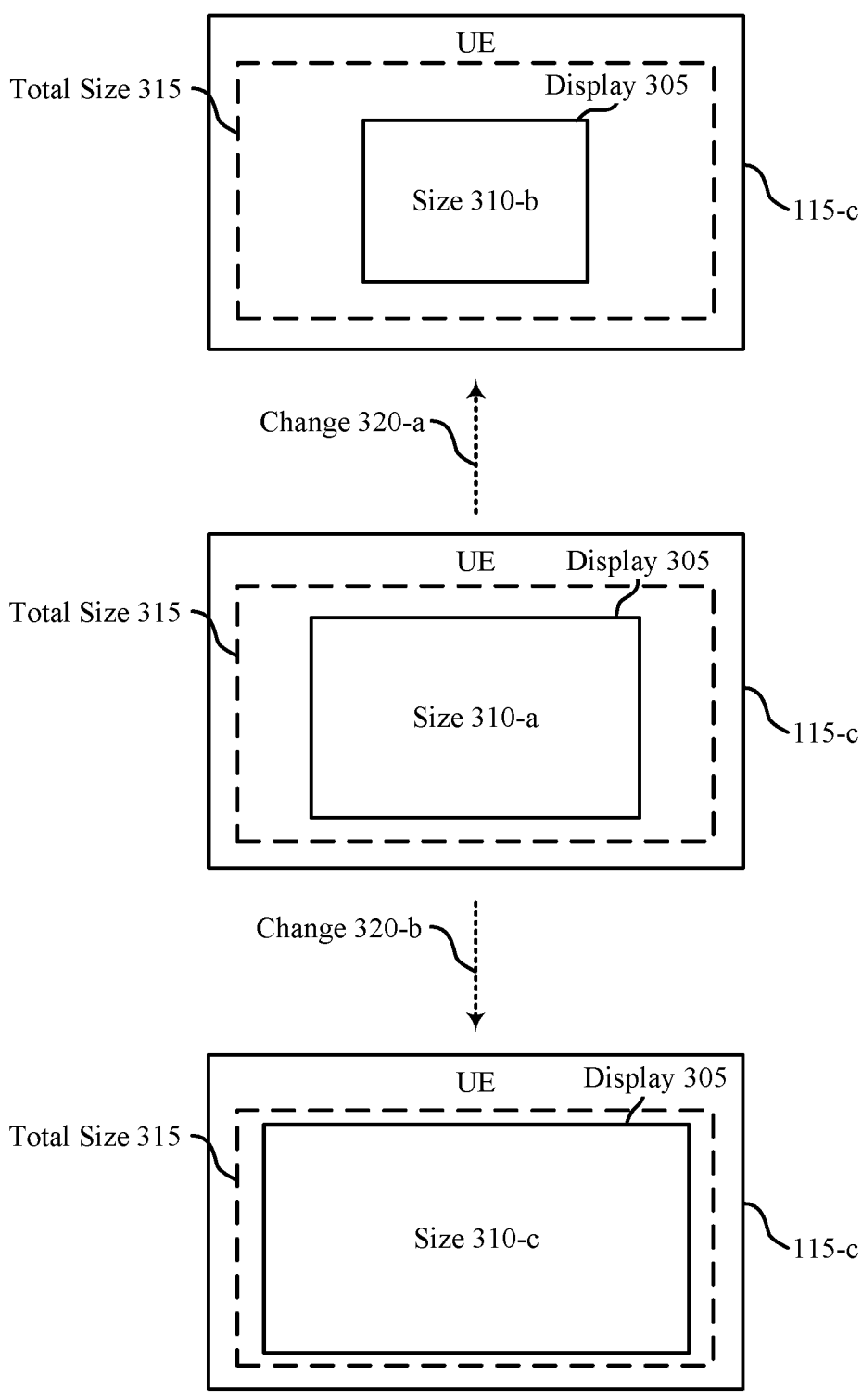
FIG. 3 illustrates an example of a display change diagram that supports techniques for dynamic resolutions in accordance with aspects of the present disclosure.

FIG. 3 illustrates an example of a display change diagram 300 that supports techniques for dynamic resolutions in accordance with aspects of the present disclosure. The display change diagram 300 may be implemented by aspects of the wireless communications system 100 and 200 as described with reference to FIGS. 1 and 2, respectively. For example, the display change diagram 300 may be implemented by a UE 115-*c*, which may be an example of a UE 115 described with reference to FIGS. 1 and 2.

The display change diagram 300 depicts a UE 115-*c* that includes a display 305 which has an adjustable size 310. The display 305 may also be associated with (e.g., have) a total size 315, which may correspond to a maximum size of the display 305 (e.g., when the display 305 is completely unfolded or rolled out).

The display change diagram 300 further depicts changes 320 which may represent example changes to the current size 310 of the display 305 that may occur during a video call. For example, the UE 115-*c* may establish a video call with a second UE 115 (not shown). At the time of the video call establishment (e.g., and before any of the changes 320), the display 305 may have a size 310-*a*. For illustrative purposes, FIG. 2 depicts the size 310-*a* as being smaller than the total size 315, however, the principles disclosed herein may be adapted and applied such that the size 310-*a* of the display 305 may be any possible size 310 of the display 305 (e.g., any size 310 from the total size 315 and a minimum size 310 of the display 305).

During the video call, the size 310 of the display 305 may undergo one or more changes 320. For example, a user of the UE 115-*c* may change the size 310 of the display 305 by unfolding, unrolling, folding, or rolling up the display 305, among other examples of changing the size 310 of the display 305. In some cases, the user may change the size 310 of the display 305 such that a resolution of the display 305 changes. For example, the display 305 may have a first value for its resolution at size 310-*a*, and the UE 115-*c* may indicate the first value for the resolution to the second UE during configuration of the video call. At one or more times during the video call, the display 305 may undergo a change 320 such that the resolution changes to a second value different from the first value.

In a first example, the size 310 of the display 305 may be decreased from the size 310-*a* to a size 310-*b* according to a change 320-*a*. For example, the user may decrease the size 310 of the display 305 from size 310-*a* to size 310-*b* by folding or rolling up the display 305. The size 310-*b* may be associated with a second (e.g., lower) value for the resolution of the display 305. Accordingly, decreasing the size 310 of the display 305 to the size 310-*b* may trigger the UE 115-*c* to transmit a change message to the second UE indicating the change to the resolution of the display 305 as described herein.

In a second example, the size 310 of the display 305 may be increased from the size 310-*a* to a size 310-*c* according to a change 320-*b*. For example, the user may increase the size 310 of the display 305 from size 310-*a* to size 310-*c* by unfolding or unrolling the display 305. The size 310-*c* may be associated with a third (e.g., higher) value for the resolution of the display 305. Accordingly, increasing the size 310 of the display 305 to the size 310-*c* may trigger the UE 115-*c* to transmit a change message to the second UE indicating the change to the resolution of the display 305 as described herein.

The triggering of the change message transmission may be based on one or more thresholds associated with the size 310 of the display 305. In some examples, the one or more thresholds may be associated with particular sizes 310 of the display 305. For example, a threshold may correspond to a particular size boundary (e.g., a fixed size 310 of the display 305) such that if the size 310 changes to cross the size boundary, the UE 115-*c* may be triggered to transmit a change message. In some other examples, the one or more thresholds may be associated with the total size 315 of the display 305. For example, a first threshold may correspond to an increase in the size 310 of the display 305 by at least x percent of the total size 315, where x is some value between 0 and 100, and a second threshold may correspond to a decrease in the size 310 of the display 305 by at least y percent of the total size 315, where y is some value between 0 and 100. Accordingly, changing the size 310 of the display 305 by at least a threshold percentage of the total size 315 (e.g., increasing the size 310 of the display 305 by at least x percent, decreasing the size 310 of the display 305 by at least y percent) may trigger the UE 115-*c* to transmit a change message. In some cases, this may reduce the frequency at which the UE 115-*c* transmits a change message, for example, with respect to the case where the size 310 is frequently changed to cross a size boundary, thereby reducing resource usage and processing in such a case.

The values of x and y may be chosen statically or dynamically. For example, the values of x and y may be configured during configuration of the video call or may be preset values stored at the UE 115-*c*. In some cases, the values of x and y may be based on an operating mode of the UE 115-*c*. For instance, the UE 115-*c* may operate according to a power savings mode in which various operating parameters are set to reduce power consumption at the UE 115-*c*. Here, the values of x and y may be larger relative to the values of x and y when the UE 115-*c* is operating according to a performance mode in which the various operating parameters are set to increase user experience and video quality. The relatively larger values of x and y associated with the power savings mode may result in a reduced frequency at which the UE 115-*c* is triggered to transmit change messages compared to the relatively smaller values of x and y associated with the performance mode. Accordingly, the UE 115-*c* may reduce power consumption associated with transmitting change messages when operating according to the power savings mode and maintain or increase video quality and user experience associated with transmitting change messages when operating according to the performance mode. In some examples, the UE 115-*c* may switch operating modes during the video call and the UE 115-*c* may change the values of x and y accordingly during the video call.

Additionally, or alternatively, the values of x and y may be based on a value of the resolution of the display 305. For example, different values of x and y may correspond to different values of the resolution. For instance, a first value of x and a first value of y may correspond to the first value of the resolution of the display 305 at size 310-*a* (e.g., 720p), a second value of x and a second value of y may correspond to the second value of the resolution of the display 305 at size 310-*b* (e.g., 480p), a third value of x and a third value of y may correspond to the third value of the resolution of the display 305 at size 310-*c* (e.g., 1080p), and so on. In some examples, the values of x and y may be based on a difference in resolution from one value of the resolution to a next (e.g., next higher, next lower) value of the resolution. For example, if a first difference between the first value of the resolution and the second value of the resolution is smaller than a second difference between the first value of the resolution and the third value of the resolution, the first value of x (e.g., that is associated with increasing the size 310 of the display 305) may be larger than the first value of y (e.g., that is associated with decreasing the size 310 of the display 305), or vice versa if the first difference is larger than the second difference.

Additionally, or alternatively, the UE 115-*c* may change the values of x and y during the video call based on a frequency at which the UE 115-*c* is triggered to transmit a change message during the video call. In some cases, a resolution or size of the display may bounce across a threshold several times over a short duration of time. For example, a display may be set to a size that is close to the threshold value. In such cases, the UE may be configured to transmit change messages each time the resolution crosses the threshold, which may be relatively often if the size of the screen bounces across the same threshold frequently in a shorter duration. In some examples, the UE 115-*c* may identify that the size 310 of the display 305 changes a threshold quantity of times within a duration such that a change message transmission is triggered, thereby identifying that the size 310 of the display 305 changes at a relatively high frequency. Accordingly, the UE 115-*c* may increase the values of x and y in response to the identifying, for example, to reduce a frequency of transmitting change messages (e.g., thus conserving power, resources, and/or processing). In some examples, the UE 115-*c* may refrain from transmitting one or more triggered change messages (e.g., for a second duration) based on identifying that the size of 310 of the display 305 changes the threshold quantity of times within the duration. In this way, the UE 115-*c* may additionally or alternatively reduce a frequency of transmitting the change messages in response to detecting that the size 310 of the display 305 is changed at a relatively high frequency.

In some examples, the UE 115-*c* may transmit a change message after identifying that the size 310 of the display 305 has changed. That is, the UE 115-*c* may identify that the size 310 of the display 305 has changed to satisfy a threshold and may identify that the size 310 of the display 305 is still actively being changed. The UE 115-*c* may pause transmission of a change message until the size 310 of the display 305 has completely changed (e.g., is no longer actively being changed). In some cases, this may reduce a quantity of changes messages transmitted to indicate a change to the resolution of the display 305. For example, if the size 310 of the display 305 is changed to satisfy more than one threshold within one change to size 310 (e.g., crosses two size boundaries, changes by at least 2x, changes by at least 2y), the UE 115-*c* may transmit a single change message to indicate the change to the resolution rather than transmit a change message each time a threshold is satisfied.

In some examples, there may be a duration during which the size 310 of the display 305 is changing, but the change message transmission has not been triggered. In some examples, the resolution of the display 305 may change during the duration, however the UE 115-*c* may receive video packets encoded according to a previously indicated value for the resolution as a result of not having yet transmitted a change message to indicate the change. Here, if the resolution of the display 305 increases during the duration, the UE 115-*c* may upscale the resolution of the received video packets or may show a smaller video on the display 305. Alternatively, if the resolution of the display 305 decreases during the duration, the UE 115-*c* may downscale the resolution of the received video packets.

Figure 4:
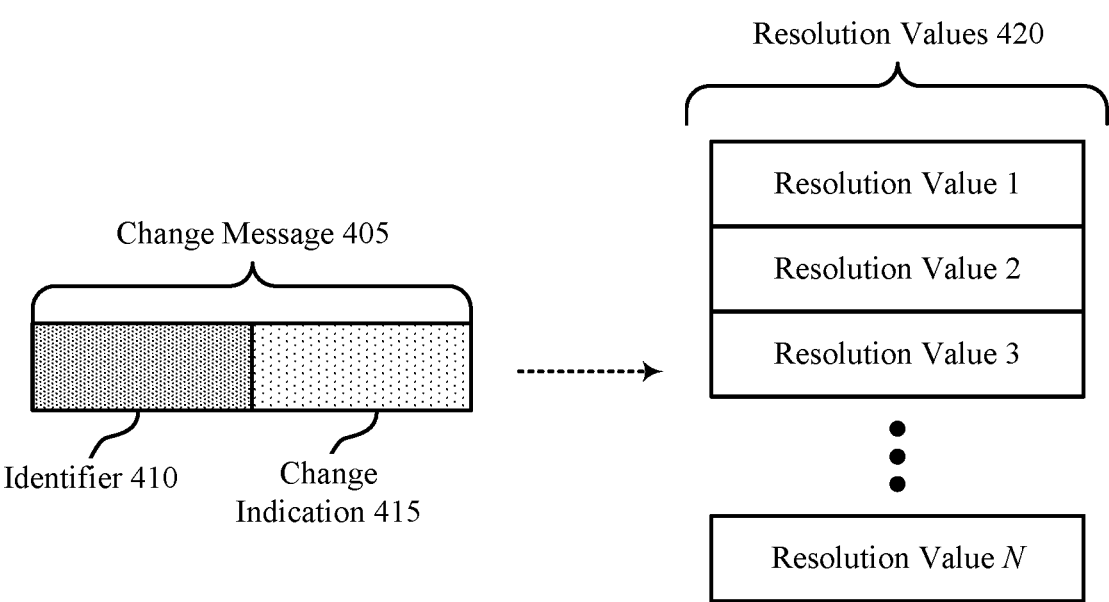
FIG. 4 illustrates an example of a messaging scheme that supports techniques for dynamic resolutions in accordance with aspects of the present disclosure.

FIG. 4 illustrates an example of a message scheme 400 that supports techniques for dynamic resolutions in accordance with aspects of the present disclosure. The message scheme 400 may be implemented by aspects of the wireless communications system 100 and 200 as described with reference to FIGS. 1 and 2, respectively. For example, the message scheme 400 may be implemented by a UE 115 to support dynamic display resolution changes during a video call.

The message scheme 400 depicts a change message 405, which may be an example of a change message 230 described with reference to FIG. 2. For example, a first UE 115 may transmit the change message 405 to a second UE 115 during a video call to dynamically indicate a change to a resolution of a display of the first UE 115.

The change message 405 may be or be included in an RTP packet. For example, the change message 405 may be included in an RTP extension header of an RTP packet. Alternatively, the change message 405 may be included in a payload of the RTP packet. In some examples, the change message 405 may correspond to one or more bytes of an RTP packet (e.g., a one byte RTP extension header, one or more bytes of the RTP packet payload).

The change message 405 may include one or more sets of bits used to communicate the change to the resolution. For example, the change message 405 may include a first set of bits corresponding to an identifier 410 associated with the first UE 115. The second UE 115 may use the first set of bits to identify the first UE 115 and determine that the other information included in the change message 405 is associated with the first UE 115. Additionally, or alternatively, the identifier 410 may indicate that the information included in the change message 405 corresponds to an indication of the change to the resolution. For example, the identifier 410 may be an RTP extension header identifier indicating that the other information included in the RTP extension header corresponds to the indication of the change to the resolution. In some cases, if the change message 405 is included in a one byte RTP extension header, the first set of bits may include bits 0 to 3 of the RTP extension header.

The change message 405 may include a second set of bits corresponding to a change indication 415 that indicates the change to the resolution. In some cases, if the change message 405 is included in a one byte RTP extension header, the second set of bits may include bits 4 to 7 of the RTP extension header. In some examples, two bits of the second set of bits (e.g., bits 4 and 5) may be used to indicate the change to the resolution and two bits of the second set of bits (e.g., bits 6 and 7) may be reserved, however, any combination of reserved bits and bits used to indicate the change to the resolution is possible.

In some examples, the change indication 415 may indicate an increase to the resolution or a decrease to the resolution. In some other examples, the change indication 415 may indicate a new value for the resolution.

In some cases, the change indication 415 may be associated with a set of resolution values 420, which may correspond to various resolution values for the display of the first UE 115 and/or a display of the second UE 115. For example, the set of resolution values 420 may include resolution value 1 through resolution value N, where N corresponds to some positive integer. In some examples, each of the resolution values may correspond to a discrete resolution value. For example, resolution value 1 may correspond to a resolution of 480p, resolution value 2 may correspond to a resolution of 720p, resolution value 3 may correspond to a resolution of 1080p, and so on. During configuration of the video call, each of the first UE 115 and the second UE 115 may indicate one of the resolution values from the set of resolution values 420 for the resolution of the respective displays of the first UE 115 and the second UE 115.

In some examples, the change indication 415 may indicate a change to the resolution relative to a previously indicated resolution value of the set of resolution values 420 (e.g., during configuration of the video call, at some time during the video call). For example, the change indication 415 may indicate a one-step increase of the resolution value (e.g., from resolution value 2 to resolution value 3), a two-step increase of the resolution value (e.g., from resolution value 1 to resolution value 3), a one-step decrease of the resolution value (e.g., from resolution value 3 to resolution value 2), a two-step decrease of the resolution value (e.g., from resolution value 3 to resolution value 1), and so on. Accordingly, the second UE 115 may receive the change indication 415 and identify a new resolution value for the display of the UE 115 based on the previously indicated resolution value and indicated step change.

In some cases, the change indication 415 may indicate the change to the resolution by indicating an index of the set of resolution values 420 corresponding to the new resolution. For example, the resolution value 1 may have an index 1, the resolution value 2 may have an index 2, the resolution value 3 may have an index 3, and so on. The change indication 415 may indicate the index corresponding to the new resolution, for example, without reference to a previously indicated resolution value.

Figure 5:
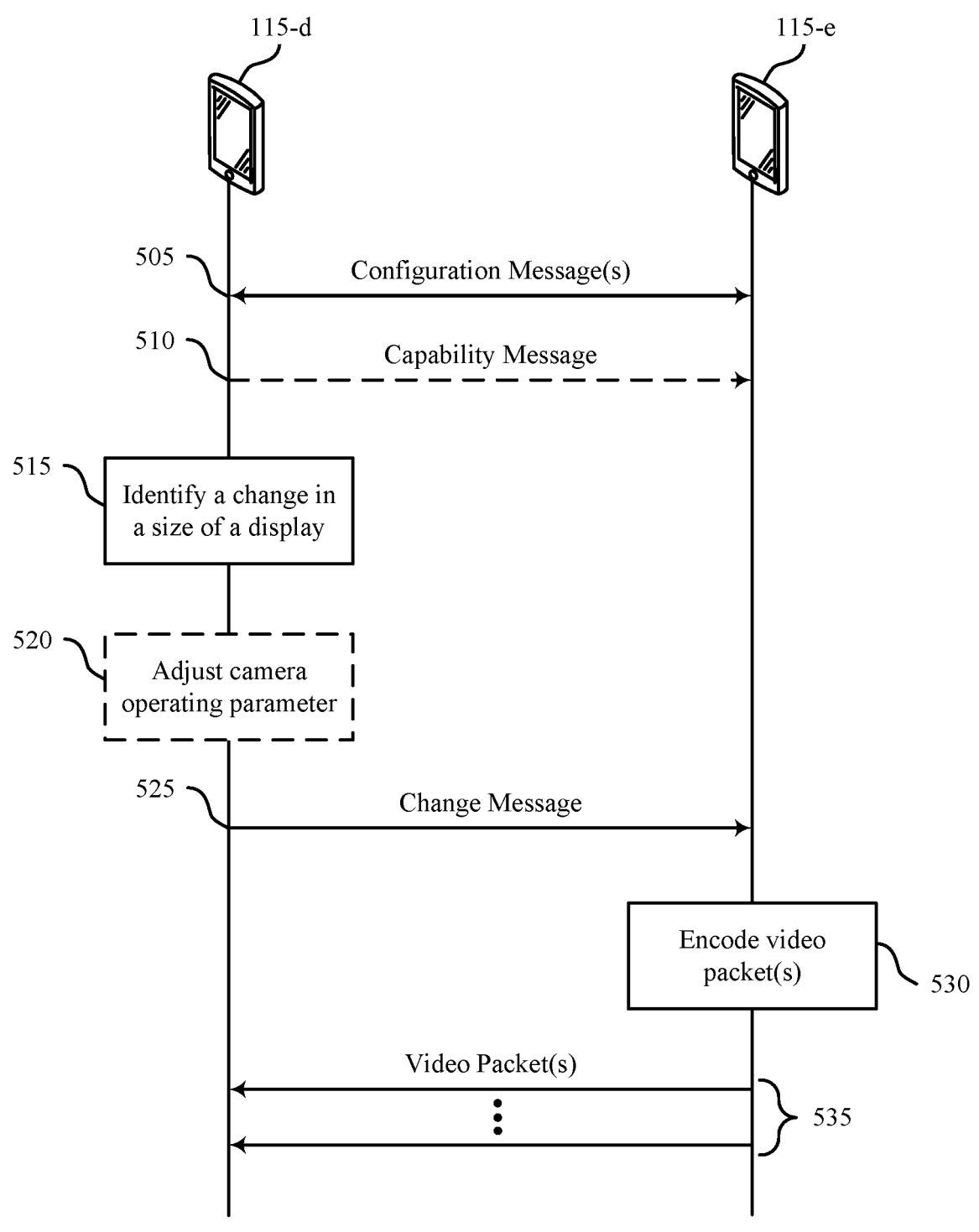
FIG. 5 illustrates an example of a process flow that supports techniques for dynamic resolutions in accordance with aspects of the present disclosure.

FIG. 5 illustrates an example of a process flow 500 that supports techniques for dynamic resolutions in accordance with aspects of the present disclosure. In some examples, the process flow 500 may be implemented by aspects of the wireless communications systems 100 and 200 as described with reference to FIGS. 1 and 2. For example, the process flow 500 may be implemented by a UE 115-d and a UE 115-e to support dynamic display resolution changes during video calls. The process flow 500 may further be implemented by the UE 115-d and the UE 115-e to provide improvements to user experience, video quality, resource usage, latency, data rates, spectral efficiency, power consumption, battery life, coordination between the UE 115-d and the UE 115-e, and processing capability, among other benefits.

The UE 115-d and the UE 115-e may be examples of a UE 115 described with reference to FIGS. 1 through 4. In the following description of the process flow 500, the operations between the UE 115-d and the UE 115-e may be communicated in a different order than the example order shown, or the operations performed by the UE 115-d and the UE 115-e may be performed in different orders or at different times. Some operations may also be omitted from the process flow 500, and other operations may be added to the process flow 500.

At 505, the UE 115-d and the UE 115-e may communicate one or more configuration messages to establish (e.g., and configure) a video call between the UE 115-d and the UE 115-e. For example, the UE 115-d may transmit a first configuration message (e.g., an SIP message, an SDP message) to the UE 115-e that indicates a first value for a resolution of a display of the UE 115-d. Additionally, or alternatively, the UE 115-e may transmit a second configuration message (e.g., an SIP message, an SDP message) to the UE 115-d that indicates a second value for a resolution of a display of the UE 115-e. The UE 115-d and the UE 115-e may communicate video packets (e.g., RTP packets including video information, IP packets including video information) during the video call in accordance with the first value for the resolution and the second value for the resolution.

At 510, the UE 115-d may optionally transmit a capability message to the UE 115-e to notify the UE 115-e of its capability to dynamically indicate a change to the resolution of the display of the UE 115-d during the video call. For example, the UE 115-d may transmit the capability message to the UE 115-e (e.g., during configuration of the video call) that indicates a capability of the UE 115-d to identify a change in a size of its display, transmit a change message indicating a change to the resolution of its display, or a combination thereof (e.g., during the video call). In some cases, the capability message 240 may be or be included in an SIP message or an SDP message. In some cases, the capability message may be transmitted before transmitting the configuration messages.

At 515, the UE 115-d may identify a change in a size of the display of the UE 115-d. For example, a user of the UE 115-d may change (e.g., increase or decrease) the size of the display of the UE 115-d by folding, unfolding, rolling up, or unrolling the display of the UE 115-d, among other examples of changing the size of the display of the UE 115. The UE 115-d may identify the change in the size (e.g., the folding, unfolding, rolling up, or unrolling of the display of the UE 115-d) and determine whether the change in the size affects (e.g., increases or decreases) the resolution of the display of the UE 115-d.

At 520, the UE 115-d may optionally adjust a camera operating parameter of a camera of the UE 115-d. For example, if the UE 115-d identifies that the change in the size results in a decrease of the resolution of its display, the UE 115-d may decrease a resolution of a sensor of the camera in order to conserve power. Alternatively, if the UE 115-d identifies that the change in the size results in an increase of the resolution of its display, the UE 115-d may increase the resolution of the sensor in order to maintain or improve video quality.

At 525, the UE 115-d may transmit a change message (e.g., a change message 230, a change message 405) to the UE 115-e that indicates a change to the resolution of the display of the UE 115-d. The UE 115-d may transmit the change message in response to identifying the change in the size of the display of the UE 115-d. In some examples, the change message may indicate an increase of the resolution (e.g., to a next higher value of the resolution) or a decrease of the resolution (e.g., to a next lower value of the resolution). In some other examples, the change message may indicate a value (e.g., an index of a value) from a set of values for the resolution as the new resolution of the display of the UE 115-d. In some cases, the change message may be or be included in an RTP packet (e.g., as an RTP extension header).

At 530, the UE 115-e may encode one or more video packets for the video call based on the change message. For example, the UE 115-e may determine the new value for the resolution of the display of the UE 115-d and may encode subsequent video packets for the video call in accordance with the new value for the resolution of the display of the UE 115-d.

At 535, the UE 115-e may transmit the one or more video packets to the UE 115-d that are encoded in accordance with the new value for the resolution of the display of the UE 115-d.

Figure 6:
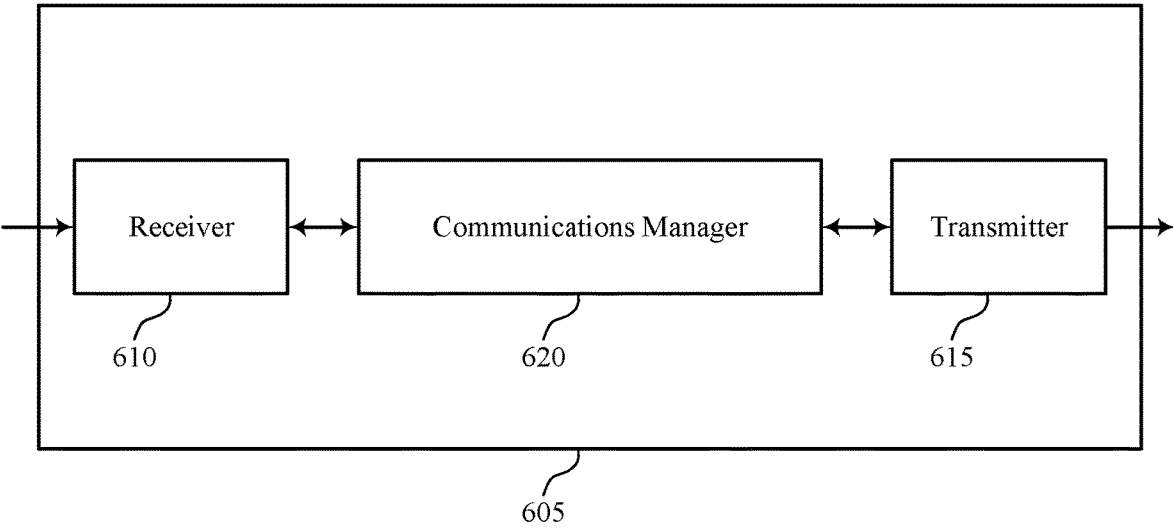
FIGS. 6 and 7 show block diagrams of devices that support techniques for dynamic resolutions in accordance with aspects of the present disclosure.

FIG. 6 shows a block diagram 600 of a device 605 that supports techniques for dynamic resolutions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for dynamic resolutions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for dynamic resolutions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for dynamic resolutions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for communicating, with a second UE, a configuration message to establish a video call between the first UE and the second UE, the configuration message indicating a first value for a resolution of a display of the first UE. The communications manager 620 may be configured as or otherwise support a means for transmitting, to the second UE and during the video call, a message indicating a change to the resolution. The communications manager 620 may be configured as or otherwise support a means for receiving, from the second UE and based on transmitting the message indicating the change to the resolution, one or more packets including video information for the video call associated with a second value for the resolution.

Additionally or alternatively, the communications manager 620 may support wireless communication at a first UE in accordance with examples as disclosed herein. For example, the communications manager 620 may be configured as or otherwise support a means for communicating, with a second UE, a configuration message to establish a video call between the first UE and the second UE, the configuration message indicating a first value for a resolution of a display of the second UE. The communications manager 620 may be configured as or otherwise support a means for receiving, from the second UE and during the video call, a message indicating a change to the resolution. The communications manager 620 may be configured as or otherwise support a means for transmitting, to the second UE and based on receiving the message indicating the change to the resolution, one or more packets including video information for the video call associated with a second value for the resolution.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources by supporting display resolution and size change management for video calls.

Figure 7:
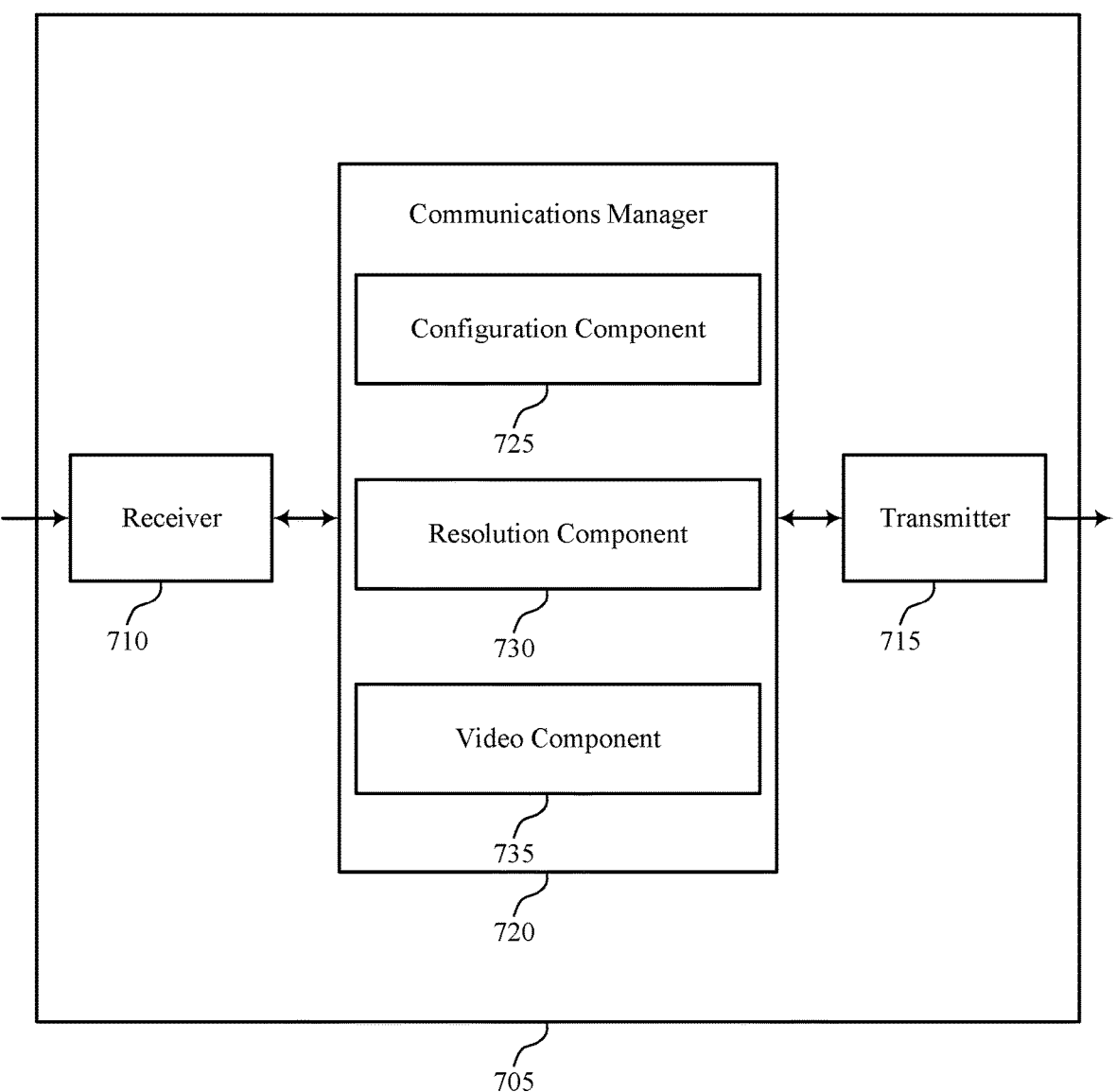

FIG. 7 shows a block diagram 700 of a device 705 that supports techniques for dynamic resolutions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for dynamic resolutions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for dynamic resolutions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for dynamic resolutions as described herein. For example, the communications manager 720 may include a configuration component 725, a resolution component 730, a video component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The configuration component 725 may be configured as or otherwise support a means for communicating, with a second UE, a configuration message to establish a video call between the first UE and the second UE, the configuration message indicating a first value for a resolution of a display of the first UE. The resolution component 730 may be configured as or otherwise support a means for transmitting, to the second UE and during the video call, a message indicating a change to the resolution. The video component 735 may be configured as or otherwise support a means for receiving, from the second UE and based on transmitting the message indicating the change to the resolution, one or more packets including video information for the video call associated with a second value for the resolution.

Additionally or alternatively, the communications manager 720 may support wireless communication at a first UE in accordance with examples as disclosed herein. The configuration component 725 may be configured as or otherwise support a means for communicating, with a second UE, a configuration message to establish a video call between the first UE and the second UE, the configuration message indicating a first value for a resolution of a display of the second UE. The resolution component 730 may be configured as or otherwise support a means for receiving, from the second UE and during the video call, a message indicating a change to the resolution. The video component 735 may be configured as or otherwise support a means for transmitting, to the second UE and based on receiving the message indicating the change to the resolution, one or more packets including video information for the video call associated with a second value for the resolution.

Figure 8:
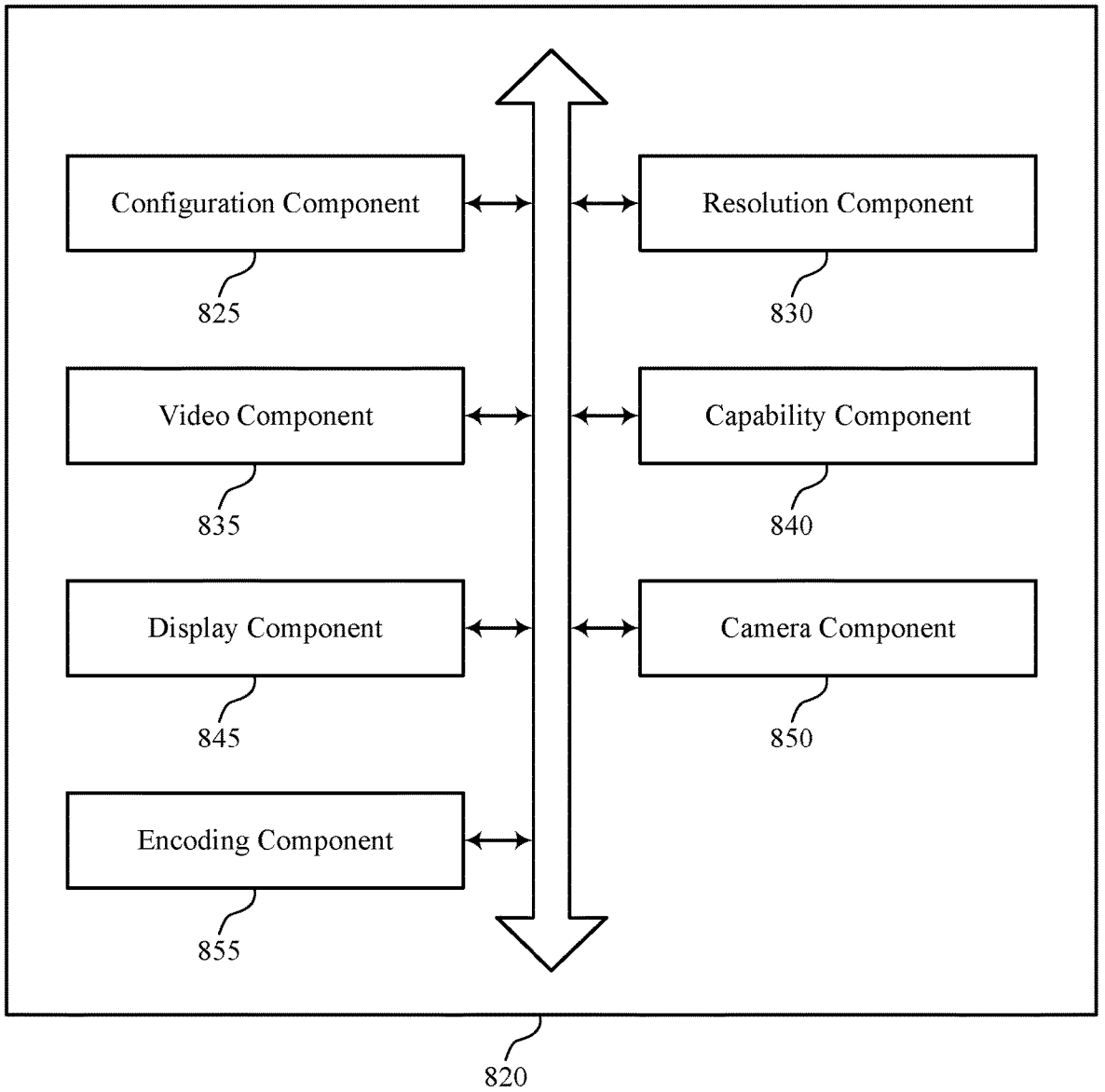
FIG. 8 shows a block diagram of a communications manager that supports techniques for dynamic resolutions in accordance with aspects of the present disclosure.

FIG. 8 shows a block diagram 800 of a communications manager 820 that supports techniques for dynamic resolutions in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for dynamic resolutions as described herein. For example, the communications manager 820 may include a configuration component 825, a resolution component 830, a video component 835, a capability component 840, a display component 845, a camera component 850, an encoding component 855, or any combination thereof. Each of these components may communicate, directly or indirectly, with one another (e.g., via one or more buses).

The communications manager 820 may support wireless communication at a first UE in accordance with examples as disclosed herein. The configuration component 825 may be configured as or otherwise support a means for communicating, with a second UE, a configuration message to establish a video call between the first UE and the second UE, the configuration message indicating a first value for a resolution of a display of the first UE. The resolution component 830 may be configured as or otherwise support a means for transmitting, to the second UE and during the video call, a message indicating a change to the resolution. The video component 835 may be configured as or otherwise support a means for receiving, from the second UE and based on transmitting the message indicating the change to the resolution, one or more packets including video information for the video call associated with a second value for the resolution.

In some examples, the capability component 840 may be configured as or otherwise support a means for transmitting, to the second UE, a capability message that indicates a capability of the first UE to transmit the message indicating the change to the resolution.

In some examples, the capability message includes an SDP packet.

In some examples, the display component 845 may be configured as or otherwise support a means for identifying a change in a size of the display of the first UE, where transmitting the message indicating the change to the resolution is based on identifying the change in the size of the display of the first UE.

In some examples, to support identifying the change in the size of the display, the display component 845 may be configured as or otherwise support a means for identifying an increase in the size of the display of the first UE based on the display being unfolded or rolled out, where the message indicating the change to the resolution indicates an increase of the resolution.

In some examples, to support identifying the change in the size of the display, the display component 845 may be configured as or otherwise support a means for identifying a decrease in the size of the display of the first UE based on the display being folded or rolled up, where the message indicating the change to the resolution indicates a decrease of the resolution.

In some examples, to support identifying the change in the size of the display, the display component 845 may be configured as or otherwise support a means for identifying that the size of the display of the first UE has changed by a threshold percentage of a total size of the display, where transmitting the message indicating the change to the resolution is triggered by the size changing by the threshold percentage.

In some examples, a value of the threshold percentage is based on an operating mode of the first UE. In some examples, the operating mode includes a power savings mode or a performance mode configured to maintain a quality of the video call at the first UE.

In some examples, the display component 845 may be configured as or otherwise support a means for changing a value of the threshold percentage based on identifying that the size of the display of the first UE changes a threshold quantity of times within a duration.

In some examples, to support transmitting the message indicating the change to the resolution, the resolution component 830 may be configured as or otherwise support a means for transmitting the message indicating the change to the resolution after identifying that the size of the display of the first UE is changed.

In some examples, the camera component 850 may be configured as or otherwise support a means for adjusting an operating parameter of a camera of the first UE based on the change to the resolution.

In some examples, the display component 845 may be configured as or otherwise support a means for identifying that a size of the display of the first UE changes a threshold quantity of times within a duration. In some examples, the resolution component 830 may be configured as or otherwise support a means for refraining from transmitting a second message indicating a second change to the resolution based on identifying that the size of the display of the first UE changes the threshold quantity of times.

In some examples, the message indicating the change to the resolution indicates that the resolution increases to a next higher value of the resolution or decreases to a next lower value of the resolution.

In some examples, the message indicating the change to the resolution indicates the second value for the resolution from a set of values for the resolution, the set of values for the resolution including at least the first value for the resolution and the second value for the resolution.

In some examples, the message indicating the change to the resolution includes a first set of bits corresponding to an identifier associated with the first UE and a second set of bits indicating the change to the resolution.

In some examples, the message indicating the change to the resolution includes an RTP packet.

Additionally or alternatively, the communications manager 820 may support wireless communication at a first UE in accordance with examples as disclosed herein. In some examples, the configuration component 825 may be configured as or otherwise support a means for communicating, with a second UE, a configuration message to establish a video call between the first UE and the second UE, the configuration message indicating a first value for a resolution of a display of the second UE. In some examples, the resolution component 830 may be configured as or otherwise support a means for receiving, from the second UE and during the video call, a message indicating a change to the resolution. In some examples, the video component 835 may be configured as or otherwise support a means for transmitting, to the second UE and based on receiving the message indicating the change to the resolution, one or more packets including video information for the video call associated with a second value for the resolution.

In some examples, the capability component 840 may be configured as or otherwise support a means for receiving, from the second UE, a capability message that indicates a capability of the second UE to transmit the message indicating the change to the resolution. In some examples, the capability message includes an SDP packet.

In some examples, the encoding component 855 may be configured as or otherwise support a means for encoding the one or more packets including the video information for the video call in accordance with the second value for the resolution based on receiving the message indicating the change to the resolution.

In some examples, the encoding component 855 may be configured as or otherwise support a means for selecting a codec for encoding the one or more packets including the video information for the video call based on the second value for the resolution.

In some examples, the message indicating the change to the resolution indicates an increase of the resolution. In some examples, the message indicating the change to the resolution indicates a decrease of the resolution. In some examples, the message indicating the change to the resolution indicates that the resolution increases to a next higher value of the resolution or decreases to a next lower value of the resolution. In some examples, the message indicating the change to the resolution indicates the second value for the resolution from a set of values for the resolution, the set of values for the resolution including at least the first value for the resolution and the second value for the resolution.

In some examples, the message indicating the change to the resolution includes a first set of bits corresponding to an identifier associated with the second UE and a second set of bits indicating the change to the resolution.

In some examples, the message indicating the change to the resolution includes an RTP packet.

Figure 9:
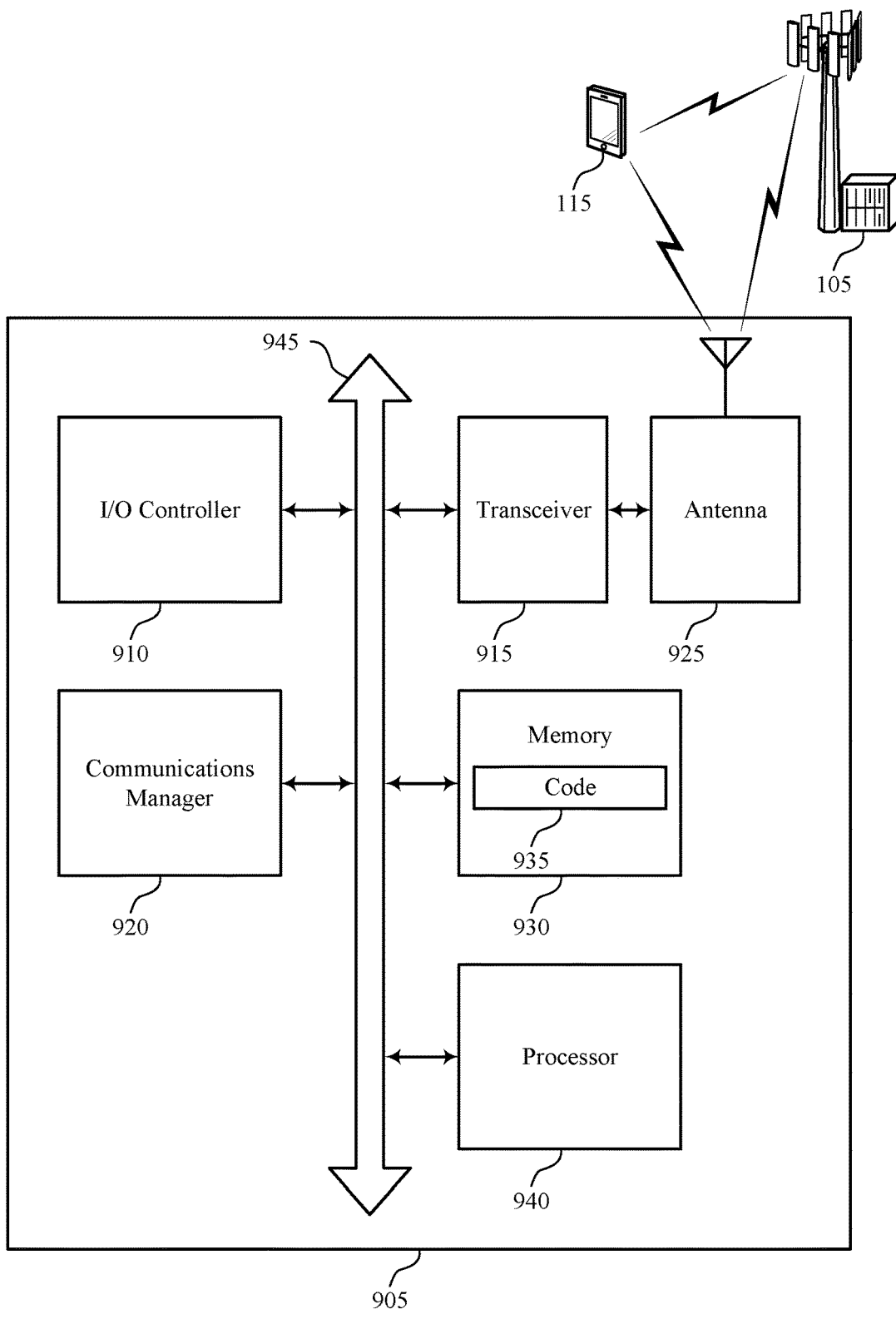
FIG. 9 shows a diagram of a system including a device that supports techniques for dynamic resolutions in accordance with aspects of the present disclosure.

FIG. 9 shows a diagram of a system 900 including a device 905 that supports techniques for dynamic resolutions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for dynamic resolutions). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for communicating, with a second UE, a configuration message to establish a video call between the first UE and the second UE, the configuration message indicating a first value for a resolution of a display of the first UE. The communications manager 920 may be configured as or otherwise support a means for transmitting, to the second UE and during the video call, a message indicating a change to the resolution. The communications manager 920 may be configured as or otherwise support a means for receiving, from the second UE and based on transmitting the message indicating the change to the resolution, one or more packets including video information for the video call associated with a second value for the resolution.

Additionally or alternatively, the communications manager 920 may support wireless communication at a first UE in accordance with examples as disclosed herein. For example, the communications manager 920 may be configured as or otherwise support a means for communicating, with a second UE, a configuration message to establish a video call between the first UE and the second UE, the configuration message indicating a first value for a resolution of a display of the second UE. The communications manager 920 may be configured as or otherwise support a means for receiving, from the second UE and during the video call, a message indicating a change to the resolution. The communications manager 920 may be configured as or otherwise support a means for transmitting, to the second UE and based on receiving the message indicating the change to the resolution, one or more packets including video information for the video call associated with a second value for the resolution.

By including or configuring the communications manager 920 in accordance with examples as described herein, the device 905 may support techniques for improved latency, video and image quality, user experience related to reduced processing, power consumption, resource utilization, coordination between devices, battery life, and processing capability, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for dynamic resolutions as described herein, or the processor 940 and the memory 930 may be otherwise configured to perform or support such operations.

FIG. 10 shows a flowchart illustrating a method 1000 that supports techniques for dynamic resolutions in accordance with aspects of the present disclosure. The operations of the method 1000 may be implemented by a first UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include communicating, with a second UE, a configuration message to establish a video call between the first UE and the second UE, the configuration message indicating a first value for a resolution of a display of the first UE. The operations of 1005 may be performed in accordance with examples as disclosed herein. In some examples, aspects of the operations of 1005 may be performed by a configuration component 825 as described with reference to FIG. 8.

At 1010, the method may include transmitting, to the second UE and during the video call, a message indicating a change to the resolution. The operations of 1010 may be performed in accordance with examples as disclosed herein. In some examples, aspects of the operations of 1010 may be performed by a resolution component 830 as described with reference to FIG. 8.

At 1015, the method may include receiving, from the second UE and based at least in part on transmitting the message indicating the change to the resolution, one or more packets including video information for the video call associated with a second value for the resolution. The operations of 1015 may be performed in accordance with examples as disclosed herein. In some examples, aspects of the operations of 1015 may be performed by a video component 835 as described with reference to FIG. 8.

FIG. 11 shows a flowchart illustrating a method 1100 that supports techniques for dynamic resolutions in accordance with aspects of the present disclosure. The operations of the method 1100 may be implemented by a first UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include communicating, with a second UE, a configuration message to establish a video call between the first UE and the second UE, the configuration message indicating a first value for a resolution of a display of the first UE. The operations of 1105 may be performed in accordance with examples as disclosed herein. In some examples, aspects of the operations of 1105 may be performed by a configuration component 825 as described with reference to FIG. 8.

At 1110, the method may include transmitting, to the second UE, a capability message that indicates a capability of the first UE to transmit a message indicating a change to the resolution. The operations of 1110 may be performed in accordance with examples as disclosed herein. In some examples, aspects of the operations of 1110 may be performed by a capability component 840 as described with reference to FIG. 8.

At 1115, the method may include transmitting, to the second UE and during the video call, the message indicating the change to the resolution. The operations of 1115 may be performed in accordance with examples as disclosed herein. In some examples, aspects of the operations of 1115 may be performed by a resolution component 830 as described with reference to FIG. 8.

At 1120, the method may include receiving, from the second UE and based at least in part on transmitting the message indicating the change to the resolution, one or more packets including video information for the video call associated with a second value for the resolution. The operations of 1120 may be performed in accordance with examples as disclosed herein. In some examples, aspects of the operations of 1120 may be performed by a video component 835 as described with reference to FIG. 8.

FIG. 12 shows a flowchart illustrating a method 1200 that supports techniques for dynamic resolutions in accordance with aspects of the present disclosure. The operations of the method 1200 may be implemented by a first UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include communicating, with a second UE, a configuration message to establish a video call between the first UE and the second UE, the configuration message indicating a first value for a resolution of a display of the first UE. The operations of 1205 may be performed in accordance with examples as disclosed herein. In some examples, aspects of the operations of 1205 may be performed by a configuration component 825 as described with reference to FIG. 8.

At 1210, the method may include identifying a change in a size of the display of the first UE. The operations of 1210 may be performed in accordance with examples as disclosed herein. In some examples, aspects of the operations of 1210 may be performed by a display component 845 as described with reference to FIG. 8.

At 1215, the method may include transmitting, to the second UE and during the video call, a message indicating a change to the resolution based at least in part on identifying the change in the size of the display of the first UE. The operations of 1215 may be performed in accordance with examples as disclosed herein. In some examples, aspects of the operations of 1215 may be performed by a resolution component 830 as described with reference to FIG. 8.

At 1220, the method may include receiving, from the second UE and based at least in part on transmitting the message indicating the change to the resolution, one or more packets including video information for the video call associated with a second value for the resolution. The operations of 1220 may be performed in accordance with examples as disclosed herein. In some examples, aspects of the operations of 1220 may be performed by a video component 835 as described with reference to FIG. 8.

FIG. 13 shows a flowchart illustrating a method 1300 that supports techniques for dynamic resolutions in accordance with aspects of the present disclosure. The operations of the method 1300 may be implemented by a first UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include communicating, with a second UE, a configuration message to establish a video call between the first UE and the second UE, the configuration message indicating a first value for a resolution of a display of the second UE. The operations of 1305 may be performed in accordance with examples as disclosed herein. In some examples, aspects of the operations of 1305 may be performed by a configuration component 825 as described with reference to FIG. 8.

At 1310, the method may include receiving, from the second UE and during the video call, a message indicating a change to the resolution. The operations of 1310 may be performed in accordance with examples as disclosed herein. In some examples, aspects of the operations of 1310 may be performed by a resolution component 830 as described with reference to FIG. 8.

At 1315, the method may include transmitting, to the second UE and based at least in part on receiving the message indicating the change to the resolution, one or more packets including video information for the video call associated with a second value for the resolution. The operations of 1315 may be performed in accordance with examples as disclosed herein. In some examples, aspects of the operations of 1315 may be performed by a video component 835 as described with reference to FIG. 8.

FIG. 14 shows a flowchart illustrating a method 1400 that supports techniques for dynamic resolutions in accordance with aspects of the present disclosure. The operations of the method 1400 may be implemented by a first UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include communicating, with a second UE, a configuration message to establish a video call between the first UE and the second UE, the configuration message indicating a first value for a resolution of a display of the second UE. The operations of 1405 may be performed in accordance with examples as disclosed herein. In some examples, aspects of the operations of 1405 may be performed by a configuration component 825 as described with reference to FIG. 8.

At 1410, the method may include receiving, from the second UE, a capability message that indicates a capability of the second UE to transmit a message indicating a change to the resolution. The operations of 1410 may be performed in accordance with examples as disclosed herein. In some examples, aspects of the operations of 1410 may be performed by a capability component 840 as described with reference to FIG. 8.

At 1415, the method may include receiving, from the second UE and during the video call, the message indicating the change to the resolution. The operations of 1415 may be performed in accordance with examples as disclosed herein. In some examples, aspects of the operations of 1415 may be performed by a resolution component 830 as described with reference to FIG. 8.

At 1420, the method may include transmitting, to the second UE and based at least in part on receiving the message indicating the change to the resolution, one or more packets including video information for the video call associated with a second value for the resolution. The operations of 1420 may be performed in accordance with examples as disclosed herein. In some examples, aspects of the operations of 1420 may be performed by a video component 835 as described with reference to FIG. 8.

FIG. 15 shows a flowchart illustrating a method 1500 that supports techniques for dynamic resolutions in accordance with aspects of the present disclosure. The operations of the method 1500 may be implemented by a first UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include communicating, with a second UE, a configuration message to establish a video call between the first UE and the second UE, the configuration message indicating a first value for a resolution of a display of the second UE. The operations of 1505 may be performed in accordance with examples as disclosed herein. In some examples, aspects of the operations of 1505 may be performed by a configuration component 825 as described with reference to FIG. 8.

At 1510, the method may include receiving, from the second UE and during the video call, a message indicating a change to the resolution. The operations of 1510 may be performed in accordance with examples as disclosed herein. In some examples, aspects of the operations of 1510 may be performed by a resolution component 830 as described with reference to FIG. 8.

At 1515, the method may include encoding the one or more packets including video information for the video call in accordance with a second value for the resolution based at least in part on receiving the message indicating the change to the resolution. The operations of 1515 may be performed in accordance with examples as disclosed herein. In some examples, aspects of the operations of 1515 may be performed by an encoding component 855 as described with reference to FIG. 8.

At 1520, the method may include transmitting, to the second UE and based at least in part on receiving the message indicating the change to the resolution, the one or more packets including the video information for the video call associated with the second value for the resolution. The operations of 1520 may be performed in accordance with examples as disclosed herein. In some examples, aspects of the operations of 1520 may be performed by a video component 835 as described with reference to FIG. 8.

The following provides an overview of aspects of the present disclosure:

Aspect 1: A method for wireless communication at a first UE, comprising: communicating, with a second UE, a configuration message to establish a video call between the first UE and the second UE, the configuration message indicating a first value for a resolution of a display of the first UE; transmitting, to the second UE and during the video call, a message indicating a change to the resolution; and receiving, from the second UE and based at least in part on transmitting the message indicating the change to the resolution, one or more packets including video information for the video call associated with a second value for the resolution.

Aspect 2: The method of aspect 1, further comprising: transmitting, to the second UE, a capability message that indicates a capability of the first UE to transmit the message indicating the change to the resolution.

Aspect 3: The method of aspect 2, wherein the capability message comprises an SDP packet.

Aspect 4: The method of any of aspects 1 through 3, further comprising: identifying a change in a size of the display of the first UE, wherein transmitting the message indicating the change to the resolution is based at least in part on identifying the change in the size of the display of the first UE.

Aspect 5: The method of aspect 4, wherein identifying the change in the size of the display comprises: identifying an increase in the size of the display of the first UE based at least in part on the display being unfolded or rolled out, wherein the message indicating the change to the resolution indicates an increase of the resolution.

Aspect 6: The method of aspect 4, wherein identifying the change in the size of the display comprises: identifying a decrease in the size of the display of the first UE based at least in part on the display being folded or rolled up, wherein the message indicating the change to the resolution indicates a decrease of the resolution.

Aspect 7: The method of any of aspects 4 through 6, wherein identifying the change in the size of the display comprises: identifying that the size of the display of the first UE has changed by a threshold percentage of a total size of the display, wherein transmitting the message indicating the change to the resolution is triggered by the size changing by the threshold percentage.

Aspect 8: The method of aspect 7, wherein a value of the threshold percentage is based at least in part on an operating mode of the first UE, the operating mode comprises a power savings mode or a performance mode configured to maintain a quality of the video call at the first UE.

Aspect 9: The method of any of aspects 7 through 8, further comprising: changing a value of the threshold percentage based at least in part on identifying that the size of the display of the first UE changes a threshold quantity of times within a duration Aspect 10: The method of any of aspects 4 through 9, wherein transmitting the message indicating the change to the resolution comprises: transmitting the message indicating the change to the resolution after identifying that the size of the display of the first UE is changed.

Aspect 11: The method of any of aspects 1 through 10, further comprising: adjusting an operating parameter of a camera of the first UE based at least in part on the change to the resolution.

Aspect 12: The method of any of aspects 1 through 11, further comprising: identifying that a size of the display of the first UE changes a threshold quantity of times within a duration; and refraining from transmitting a second message indicating a second change to the resolution based at least in part on identifying that the size of the display of the first UE changes the threshold quantity of times Aspect 13: The method of any of aspects 1 through 12, wherein the message indicating the change to the resolution indicates that the resolution increases to a next higher value of the resolution or decreases to a next lower value of the resolution.

Aspect 14: The method of any of aspects 1 through 13, wherein the message indicating the change to the resolution indicates the second value for the resolution from a set of values for the resolution, the set of values for the resolution comprising at least the first value for the resolution and the second value for the resolution.

Aspect 15: The method of any of aspects 1 through 14, wherein the message indicating the change to the resolution comprises a first set of bits corresponding to an identifier associated with the first UE and a second set of bits indicating the change to the resolution.

Aspect 16: The method of any of aspects 1 through 15, wherein the message indicating the change to the resolution comprises an RTP packet.

Aspect 17: A method for wireless communication at a first UE, comprising: communicating, with a second UE, a configuration message to establish a video call between the first UE and the second UE, the configuration message indicating a first value for a resolution of a display of the second UE; receiving, from the second UE and during the video call, a message indicating a change to the resolution; and transmitting, to the second UE and based at least in part on receiving the message indicating the change to the resolution, one or more packets including video information for the video call associated with a second value for the resolution.

Aspect 18: The method of aspect 17, further comprising: receiving, from the second UE, a capability message that indicates a capability of the second UE to transmit the message indicating the change to the resolution.

Aspect 19: The method of aspect 18, wherein the capability message comprises an SDP packet.

Aspect 20: The method of any of aspects 17 through 19, further comprising: encoding the one or more packets including the video information for the video call in accordance with the second value for the resolution based at least in part on receiving the message indicating the change to the resolution.

Aspect 21: The method of aspect 20, further comprising: selecting a codec for encoding the one or more packets including the video information for the video call based at least in part on the second value for the resolution.

Aspect 22: The method of any of aspects 17 through 21, wherein the message indicating the change to the resolution indicates an increase of the resolution.

Aspect 23: The method of any of aspects 17 through 21, wherein the message indicating the change to the resolution indicates a decrease of the resolution.

Aspect 24: The method of any of aspects 17 through 23, wherein the message indicating the change to the resolution indicates that the resolution increases to a next higher value of the resolution or decreases to a next lower value of the resolution.

Aspect 25: The method of any of aspects 17 through 24, wherein the message indicating the change to the resolution indicates the second value for the resolution from a set of values for the resolution, the set of values for the resolution comprising at least the first value for the resolution and the second value for the resolution.

Aspect 26: The method of any of aspects 17 through 25, wherein the message indicating the change to the resolution comprises a first set of bits corresponding to an identifier associated with the second UE and a second set of bits indicating the change to the resolution.

Aspect 27: The method of any of aspects 17 through 26, wherein the message indicating the change to the resolution comprises an RTP packet.

Aspect 28: An apparatus for wireless communication at a first UE, comprising a processor; memory coupled with the processor; and instructions stored in the memory and executable by the processor to cause the apparatus to perform a method of any of aspects 1 through 16.

Aspect 29: An apparatus for wireless communication at a first UE, comprising at least one means for performing a method of any of aspects 1 through 16.

Aspect 30: A non-transitory computer-readable medium storing code for wireless communication at a first UE, the code comprising instructions executable by a processor to perform a method of any of aspects 1 through 16.

Aspect 31: An apparatus for wireless communication at a first UE, comprising a processor; memory coupled with the processor; and instructions stored in the memory and executable by the processor to cause the apparatus to perform a method of any of aspects 17 through 27.

Aspect 32: An apparatus for wireless communication at a first UE, comprising at least one means for performing a method of any of aspects 17 through 27.

Aspect 33: A non-transitory computer-readable medium storing code for wireless communication at a first UE, the code comprising instructions executable by a processor to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE) for wireless communication, comprising:

at least one memory; and at least one processor coupled to the at least one memory, wherein the at least one processor is configured to:

communicate, with a second UE, a configuration message to establish a video call between the first UE and the second UE, wherein the configuration message indicates a first value for a resolution of a hardware display of the first UE;

identify that a change in a size of the hardware display of the first UE is at least a threshold percentage of a total size of the hardware display;

transmit, to the second UE and during the video call, a message that indicates a change to the resolution based at least in part on the identification; and receive, from the second UE and based at least in part on transmission of the message, one or more packets that include video information for the video call associated with a second value for the resolution.

2. The first UE of claim 1, wherein the at least one processor is further configured to:

transmit, to the second UE, a capability message that indicates a capability of the first UE to transmit the message.

3. The first UE of claim 2, wherein the capability message comprises a session description protocol packet.

4. The first UE of claim 1, wherein, to identify the change in the size of the hardware display, the at least one processor is configured to:

identify an increase in the size of the hardware display of the first UE based at least in part on the hardware display being unfolded or rolled out, wherein the message indicates an increase of the resolution.

5. The first UE of claim 1, wherein, to identify the change in the size of the hardware display, the at least one processor is configured to:

identify a decrease in the size of the hardware display of the first UE based at least in part on the hardware display being folded or rolled up, wherein the message indicates a decrease of the resolution.

6. The first UE of claim 1, wherein a value of the threshold percentage is based at least in part on an operating mode of the first UE, and wherein the operating mode comprises a power savings mode or a performance mode configured to maintain a quality of the video call at the first UE.

7. The first UE of claim 1, wherein the at least one processor is further configured to:

change a value of the threshold percentage based at least in part on an identification that the size of the hardware display of the first UE changes a threshold quantity of times within a duration.

8. The first UE of claim 7, wherein, to transmit the message, the at least one processor is configured to:

transmit the message after the identification that the size of the hardware display of the first UE is changed the threshold quantity of times.

9. The first UE of claim 1, wherein the at least one processor is further configured to:

adjust an operating parameter of a camera of the first UE based at least in part on the change to the resolution.

10. The first UE of claim 1, wherein the first UE is further configured to:

identify that a size of the hardware display of the first UE changes a threshold quantity of times within a duration; and refrain from transmitting a second message that indicates a second change to the resolution based at least in part on the identification that the size of the hardware display of the first UE changes the threshold quantity of times.

11. The first UE of claim 1, wherein the message indicates that the resolution increases to a next higher value of the resolution or decreases to a next lower value of the resolution.

12. The first UE of claim 1, wherein the message indicates the second value for the resolution from a set of values for the resolution, and wherein the set of values for the resolution comprises at least the first value for the resolution and the second value for the resolution.

13. The first UE of claim 1, wherein the message comprises a first set of bits that correspond to an identifier associated with the first UE and a second set of bits that indicate the change to the resolution.

14. The first UE of claim 1, wherein the message comprises a real-time transport protocol packet.

15. A first user equipment (UE) for wireless communication, comprising:

at least one memory; and at least one processor coupled to the at least one memory, wherein the at least one processor is configured to:

communicate, with a second UE, a configuration message to establish a video call between the first UE and the second UE, wherein the configuration message indicates a first value for a resolution of a hardware display of the second UE;

receive, from the second UE and during the video call, a message that indicates a change to the resolution based at least in part on identification that a change of a size of the hardware display is at least a threshold percentage of a total size of the hardware display; and transmit, to the second UE and based at least in part on reception of the message, one or more packets that include video information for the video call associated with a second value for the resolution.

16. The first UE of claim 15, wherein the at least one processor is further configured to:

receive, from the second UE, a capability message that indicates a capability of the second UE to transmit the message.

17. The first UE of claim 16, wherein the capability message comprises a session description protocol packet.

18. The first UE of claim 15, wherein the at least one processor is further configured to:

encode the one or more packets in accordance with the second value for the resolution based at least in part on reception of the message.

19. The first UE of claim 18, wherein the at least one processor is further configured to:

select a codec for encoding the one or more packets based at least in part on the second value for the resolution.

20. The first UE of claim 15, wherein the message indicates an increase of the resolution.

21. The first UE of claim 15, wherein the message indicates a decrease of the resolution.

22. The first UE of claim 15, wherein the message indicates that the resolution increases to a next higher value of the resolution or decreases to a next lower value of the resolution.

23. The first UE of claim 15, wherein the message indicates the second value for the resolution from a set of values for the resolution, and wherein the set of values for the resolution comprises at least the first value for the resolution and the second value for the resolution.

24. The first UE of claim 15, wherein the message comprises a first set of bits that correspond to an identifier associated with the first UE and a second set of bits that indicate the change to the resolution.

25. The first UE of claim 15, wherein the message comprises a real-time transport protocol packet.

26. A method of wireless communication performed by a first user equipment (UE), comprising:

communicating, with a second UE, a configuration message to establish a video call between the first UE and the second UE, the configuration message indicating a first value for a resolution of a hardware display of the first UE;

identifying that a change in a size of the hardware display of the first UE is at least a threshold percentage of a total size of the hardware display;

transmitting, to the second UE and during the video call, a message indicating a change to the resolution based at least in part on the identification; and receiving, from the second UE and based at least in part on transmitting the message indicating the change to the resolution, one or more packets including video information for the video call associated with a second value for the resolution.

27. The method of claim 26, further comprising:

transmitting, to the second UE, a capability message that indicates a capability of the first UE to transmit the message.

28. A method of wireless communication performed by a first user equipment (UE), comprising:

communicating, with a second UE, a configuration message to establish a video call between the first UE and the second UE, the configuration message indicating a first value for a resolution of a hardware display of the second UE;

receiving, from the second UE and during the video call, a message indicating a change to the resolution based at least in part on identification that a change of a size of the hardware display is at least a threshold percentage of a total size of the hardware display; and transmitting, to the second UE and based at least in part on receiving the message indicating the change to the resolution, one or more packets including video information for the video call associated with a second value for the resolution.

29. The first UE of claim 1, wherein the total size of the hardware display is a maximum size of the hardware display.

30. The first UE of claim 1, wherein the hardware display is foldable.

31. The first UE of claim 1, wherein the hardware display is rollable.

\* \* \* \* \*